US012651166B2

(12) United States Patent
Vartakavi et al.

(10) Patent No.: US 12,651,166 B2
(45) Date of Patent: *Jun. 9, 2026

(54) MUSIC RELEASE DISAMBIGUATION USING MULTI-MODAL NEURAL NETWORKS

(71) Applicant: Gracenote, Inc., Emeryville, CA (US)

(72) Inventors: Aneesh Vartakavi, Emeryville, CA (US); Konstantinos Antonio Dimitriou, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/032,880

(22) Filed: Jan. 21, 2025

(65) Prior Publication Data

US 2025/0165787 A1 May 22, 2025

Related U.S. Application Data

(63) Continuation of application No. 17/203,631, filed on Mar. 16, 2021, now Pat. No. 12,242,960.

(30) Foreign Application Priority Data

Mar. 8, 2021 (GR) .............................. 20210100137

(51) Int. Cl.
*G06F 16/60* (2019.01)
*G06F 16/65* (2019.01)
(Continued)

(52) U.S. Cl.
CPC ............... *G06N 3/08* (2013.01); *G06F 16/65* (2019.01); *G06N 3/04* (2013.01)

(58) Field of Classification Search
CPC . G06F 16/65; G06N 3/04; G06N 3/08; G06N 3/09
See application file for complete search history.

(56) References Cited

U.S. PATENT DOCUMENTS

| | | |
|---|---|---|
| 2007/0106657 A1 | 5/2007 | Brzeski et al. |
| 2007/0268292 A1 | 11/2007 | Purang et al. |

(Continued)

OTHER PUBLICATIONS

Article entitled "Master's Thesis in Computer Science: Recognizing Artist Ambiguity with Machine Learning Techniques", by Gonzalez, dated Jun. 19, 2012 (Year: 2012).*

(Continued)

*Primary Examiner* — Mahesh H Dwivedi
(74) *Attorney, Agent, or Firm* — McDonnell Boehnen Hulbert & Berghoff LLP

(57) ABSTRACT

Methods and systems for disambiguating musical artist names are disclosed. Musical-artist-release records (MARRs) may be input to a multi-modal artificial neural network (ANN). Each MARR may be associated with a musical release of an artist, and may include a release ID and an artist ID, and release data in categories including music media content and metadata categories including sub-definitive musician name of the artist and release subcategories. All n-tuples of MARRs may be formed, and for each n-tuple, the ANN may be applied concurrently to each MARR to generate a release feature vector (RFV) that includes a set of sub-feature vectors, each characterizing a different category of release data. For each n-tuple, the ANN may be trained to cluster in a multi-dimensional RFV space RFVs of the same artist ID, and to separate RFVs of different artist IDs. The MARRs and their RFVs may be stored in a release database.

20 Claims, 13 Drawing Sheets

(51) Int. Cl.
    *G06N 3/04*          (2023.01)
    *G06N 3/08*          (2023.01)

(56)           References Cited

U.S. PATENT DOCUMENTS

| | | |
|---|---|---|
| 2007/0282886 A1 | 12/2007 | Purang et al. |
| 2013/0332400 A1 | 12/2013 | Gonzalez |
| 2016/0189052 A1 | 6/2016 | Gonzalez |
| 2021/0157835 A1 | 5/2021 | Vartakavi et al. |

OTHER PUBLICATIONS

Royo-Letelier et al., "Disambiguating Music Artists at Scale with Audio Metric Learning", 19th International Society for Music Information Retrieval Conference, 2018, 8 pages.

* cited by examiner

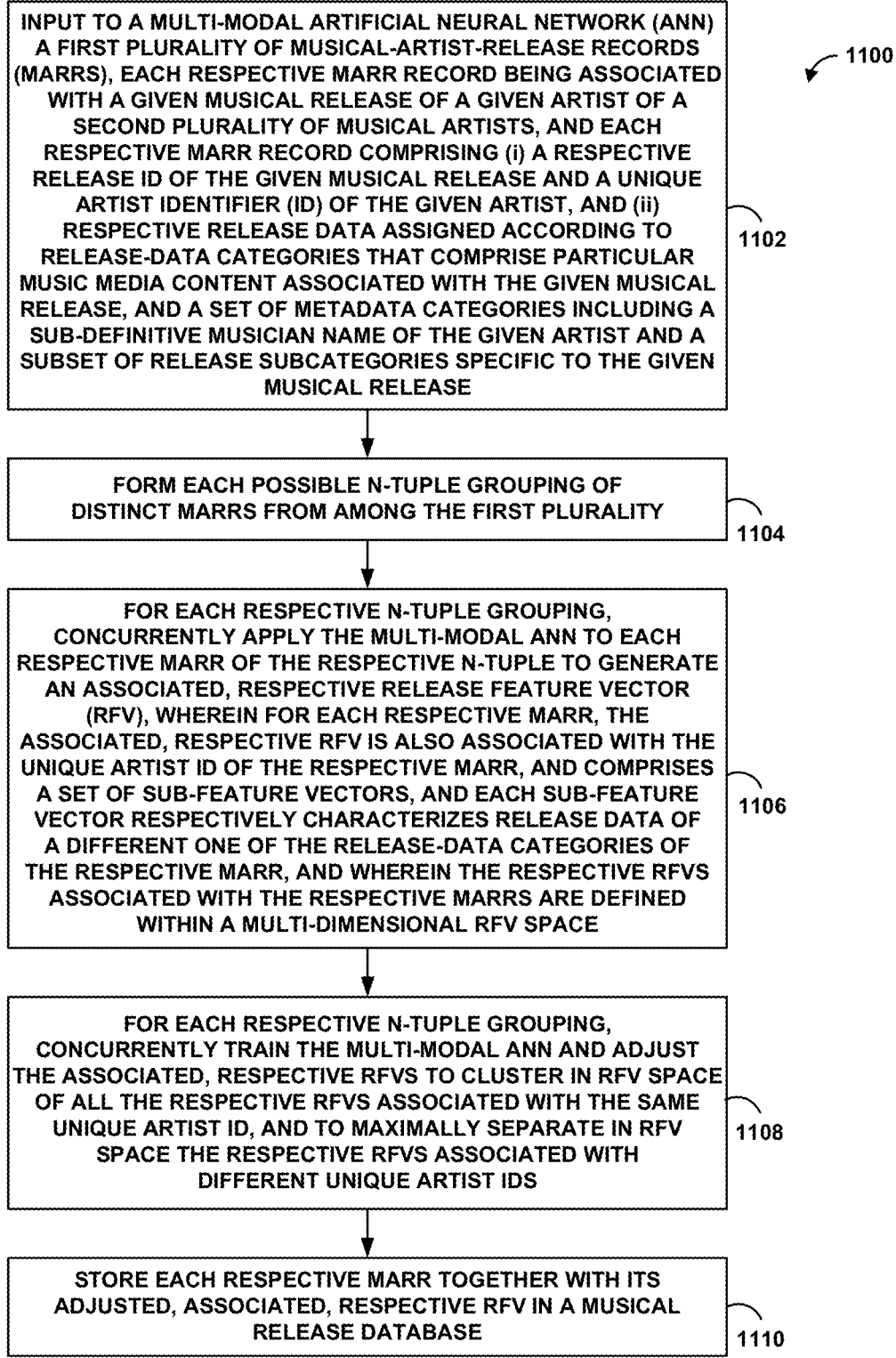

INPUT TO A MULTI-MODAL ARTIFICIAL NEURAL NETWORK (ANN) A FIRST PLURALITY OF MUSICAL-ARTIST-RELEASE RECORDS (MARRS), EACH RESPECTIVE MARR RECORD BEING ASSOCIATED WITH A GIVEN MUSICAL RELEASE OF A GIVEN ARTIST OF A SECOND PLURALITY OF MUSICAL ARTISTS, AND EACH RESPECTIVE MARR RECORD COMPRISING (i) A RESPECTIVE RELEASE ID OF THE GIVEN MUSICAL RELEASE AND A UNIQUE ARTIST IDENTIFIER (ID) OF THE GIVEN ARTIST, AND (ii) RESPECTIVE RELEASE DATA ASSIGNED ACCORDING TO RELEASE-DATA CATEGORIES THAT COMPRISE PARTICULAR MUSIC MEDIA CONTENT ASSOCIATED WITH THE GIVEN MUSICAL RELEASE, AND A SET OF METADATA CATEGORIES INCLUDING A SUB-DEFINITIVE MUSICIAN NAME OF THE GIVEN ARTIST AND A SUBSET OF RELEASE SUBCATEGORIES SPECIFIC TO THE GIVEN MUSICAL RELEASE

1100

1102

FORM EACH POSSIBLE N-TUPLE GROUPING OF DISTINCT MARRS FROM AMONG THE FIRST PLURALITY

1104

FOR EACH RESPECTIVE N-TUPLE GROUPING, CONCURRENTLY APPLY THE MULTI-MODAL ANN TO EACH RESPECTIVE MARR OF THE RESPECTIVE N-TUPLE TO GENERATE AN ASSOCIATED, RESPECTIVE RELEASE FEATURE VECTOR (RFV), WHEREIN FOR EACH RESPECTIVE MARR, THE ASSOCIATED, RESPECTIVE RFV IS ALSO ASSOCIATED WITH THE UNIQUE ARTIST ID OF THE RESPECTIVE MARR, AND COMPRISES A SET OF SUB-FEATURE VECTORS, AND EACH SUB-FEATURE VECTOR RESPECTIVELY CHARACTERIZES RELEASE DATA OF A DIFFERENT ONE OF THE RELEASE-DATA CATEGORIES OF THE RESPECTIVE MARR, AND WHEREIN THE RESPECTIVE RFVS ASSOCIATED WITH THE RESPECTIVE MARRS ARE DEFINED WITHIN A MULTI-DIMENSIONAL RFV SPACE

1106

FOR EACH RESPECTIVE N-TUPLE GROUPING, CONCURRENTLY TRAIN THE MULTI-MODAL ANN AND ADJUST THE ASSOCIATED, RESPECTIVE RFVS TO CLUSTER IN RFV SPACE OF ALL THE RESPECTIVE RFVS ASSOCIATED WITH THE SAME UNIQUE ARTIST ID, AND TO MAXIMALLY SEPARATE IN RFV SPACE THE RESPECTIVE RFVS ASSOCIATED WITH DIFFERENT UNIQUE ARTIST IDS

1108

STORE EACH RESPECTIVE MARR TOGETHER WITH ITS ADJUSTED, ASSOCIATED, RESPECTIVE RFV IN A MUSICAL RELEASE DATABASE

MUSIC RELEASE DISAMBIGUATION USING MULTI-MODAL NEURAL NETWORKS

CROSS-REFERENCE TO RELATED APPLICATIONS

This application claims priority to U.S. application Ser. No. 17/203,631, filed on Mar. 16, 2021, which claims priority to Greek patent application No. 20210100137, filed on Mar. 8, 2021, the contents of both of which are hereby incorporated in their entirety herein by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method for disambiguating musical artist names carried out by a computing system is disclosed. The method may involve: inputting to a multi-modal artificial neural network (ANN) implemented on the computing system a first plurality of musical-artist-release records (MARRs), each respective MARR record being associated with a given musical release of a given artist of a second plurality of musical artists, and each respective MARR record comprising (i) a respective release ID of the given musical release and a unique artist identifier (ID) of the given artist, and (ii) respective release data assigned according to release-data categories that comprise particular music media content associated with the given musical release, and a set of metadata categories including a sub-definitive musician name of the given artist and a subset of release subcategories specific to the given musical release; forming each possible n-tuple grouping of distinct MARRs from among the first plurality; for each respective n-tuple grouping, concurrently applying the multi-modal ANN to each respective MARR of the respective n-tuple to generate an associated, respective release feature vector (RFV), wherein for each respective MARR, the associated, respective RFV is also associated with the unique artist ID of the respective MARR, and comprises a set of sub-feature vectors, each sub-feature vector respectively characterizing release data of a different one of the release-data categories of the respective MARR, and wherein the respective RFVs associated with the respective MARRs are defined within a multi-dimensional RFV space; for each respective n-tuple grouping, concurrently training the multi-modal ANN and adjusting the associated, respective RFVs to cluster in RFV space of all the respective RFVs associated with the same unique artist ID, and to maximally separate in RFV space the respective RFVs associated with different unique artist IDs; and storing each respective MARR together with its adjusted, associated, respective RFV in a musical release database.

In another aspect, a system for disambiguating musical artist names is disclosed. The system may include one or more processors; and memory storing instructions that, when executed by the one or more processors, cause the system to carry out operations including: inputting to a multi-modal artificial neural network (ANN) implemented in the system a first plurality of musical-artist-release records (MARRs), each respective MARR record being associated with a given musical release of a given artist of a second plurality of musical artists, and each respective MARR record comprising (i) a respective release ID of the given musical release and a unique artist identifier (ID) of the given artist, and (ii) respective release data assigned according to release-data categories that comprise particular music media content associated with the given musical release, and a set of metadata categories including a sub-definitive musician name of the given artist and a subset of release subcategories specific to the given musical release; forming each possible n-tuple grouping of distinct MARRs from among the first plurality; for each respective n-tuple grouping, concurrently applying the multi-modal ANN to each respective MARR of the respective n-tuple to generate an associated, respective release feature vector (RFV), wherein for each respective MARR, the associated, respective RFV is also associated with the unique artist ID of the respective MARR, and comprises a set of sub-feature vectors, each sub-feature vector respectively characterizing release data of a different one of the release-data categories of the respective MARR, and wherein the respective RFVs associated with the respective MARRs are defined within a multi-dimensional RFV space; for each respective n-tuple grouping, concurrently training the multi-modal ANN and adjusting the associated, respective RFVs to cluster in RFV space of all the respective RFVs associated with the same unique artist ID, and to maximally separate in RFV space the respective RFVs associated with different unique artist IDs; and storing each respective MARR together with its adjusted, associated, respective RFV in a musical release database.

In still another aspect, a non-transitory computer-readable medium is disclosed. The non-transitory computer-readable may have instructions stored thereon that, when executed by one or more processors of a system for disambiguating musical artist names, cause the system to carry out operations including: inputting to a multi-modal artificial neural network (ANN) implemented in the system a first plurality of musical-artist-release records (MARRs), each respective MARR record being associated with a given musical release of a given artist of a second plurality of musical artists, and each respective MARR record comprising (i) a respective release ID of the given musical release and a unique artist identifier (ID) of the given artist, and (ii) respective release data assigned according to release-data categories that comprise particular music media content associated with the given musical release, and a set of metadata categories including a sub-definitive musician name of the given artist and a subset of release subcategories specific to the given musical release; forming each possible n-tuple grouping of distinct MARRs from among the first plurality; for each respective n-tuple grouping, concurrently applying the multi-modal ANN to each respective MARR of the respective n-tuple to generate an associated, respective release feature vector (RFV), wherein for each respective MARR, the associated, respective RFV is also associated with the unique artist ID of the respective MARR, and comprises a set of sub-feature vectors, each sub-feature vector respectively characterizing release data of a different one of the release-data categories of the respective MARR, and wherein the respective RFVs associated with the respective MARRs are defined within a multi-dimensional RFV space; for each respective n-tuple grouping, concurrently training the multi-modal ANN and adjusting the associated, respective RFVs to cluster in RFV space of all the respective RFVs associated with the same unique artist ID, and to maximally separate in RFV space the respective RFVs associated with different unique artist IDs; and storing each respective MARR together with its adjusted, associated, respective RFV in a musical release database.

BRIEF DESCRIPTION OF THE DRAWINGS

FIG. 11 is a flow chart of an example method of automated music release disambiguation, in accordance with example embodiments.

DETAILED DESCRIPTION

I. Overview

Figure 1:
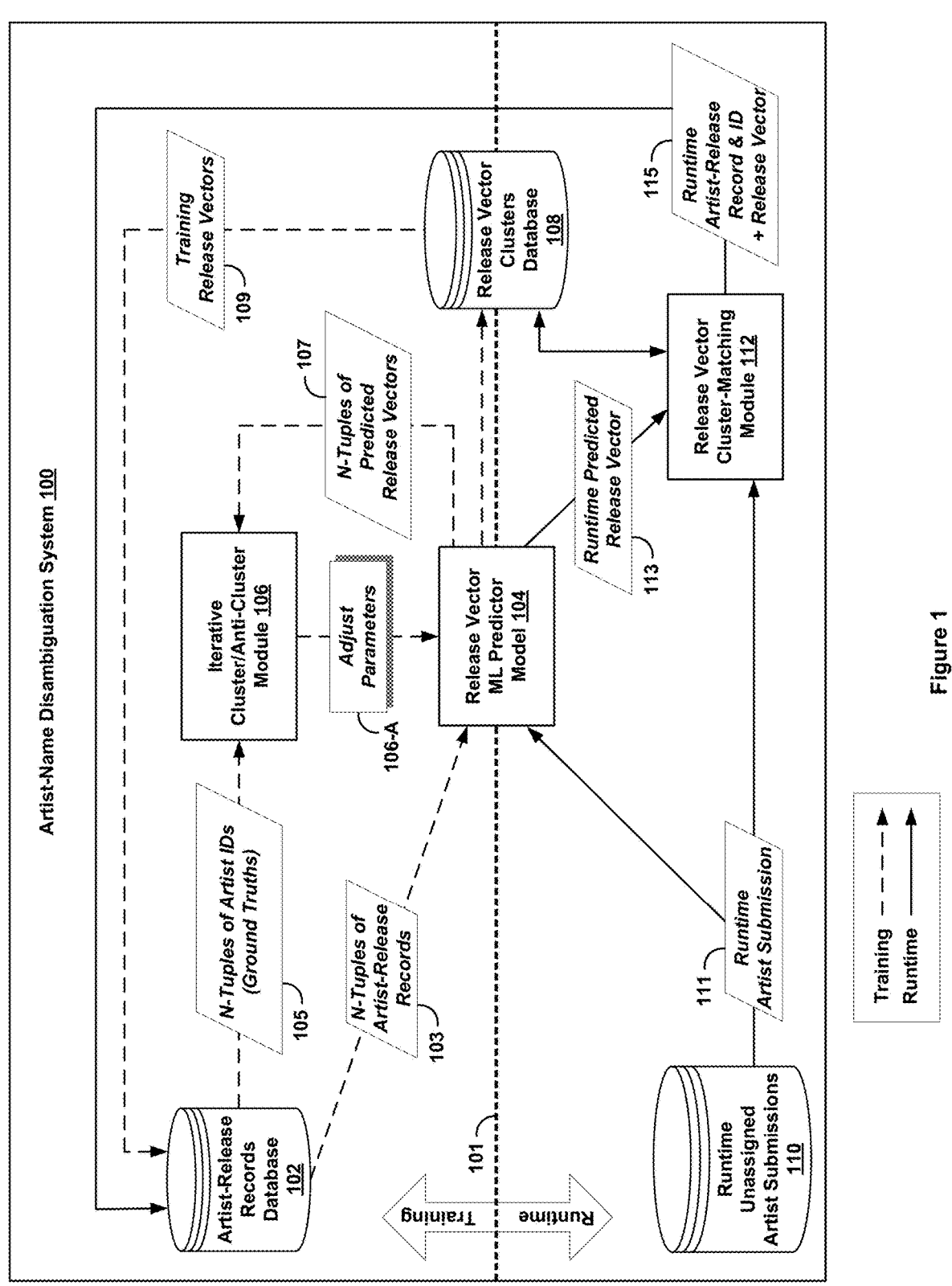
FIG. 1 is a simplified operational block diagram of an automated music release disambiguation system in which various disclosed principles can be implemented.

Content providers may provide various forms of online streaming and/or downloadable media content to end users, including music and other audio content, for example. A content provider may be a direct source of content for end users, or may provide content to one or more content distribution services, such as broadcasters, which then deliver selected content to end users. Content may include digital and/or analog music and/or audio media data, and may include video and/or other visual graphic data as well, such as video components or counterparts of music media (e.g., music videos) and/or artwork graphical media associated with musical albums. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users. Media content to end users may be delivered as streaming content for immediate playout and/or may be downloaded media files that may be locally stored on user devices for playout at any time, for example.

For the case of online music content, a content provider or distribution service may allow or enable end users to access music content via an interactive web-based interface, such as a web page or web-based application. User selection may include direct selection of particular music content, selection of mixes of various music content, and/or selection of categories of music content, for example. A web page or web-based application may allow users to browse content according to various criteria and/or categories such as genre, content title, and musical artist name, among others. For example, a user may search and select a particular title, one or more songs by a particular musical artist, or give a web-based application discretion to select and deliver content according to genre. Other user-selection capabilities and options may be available as well.

An online music content provider and/or distribution service may maintain a repository of music media data arranged to accommodate various user access/selection scenarios. In a typical arrangement, such a repository of music content may be organized in the form of music "releases." Each music release may be a data record that includes music media content and associated metadata that, together, support user access, and also address other practical considerations of managing large volumes and varieties of music media content. A music release may be considered to be or to represent a collection of one or more music media files that meets one or another set of release criteria for being made available to end users of the content provider or distributor. Release criteria may include a musical artist's designation of a particular collection, marketing considerations, or production considerations, among others. Non-limiting examples of releases include single songs or tracks, musical albums of multiples or tracks, and anthology collections. Other forms of audio, besides music, are possible as well.

In practice, a music release may include, in addition to the actual media content, a unique release identifier (ID), a unique ID of a musical artist (who may be an individual or a musical group, for example), and metadata including a title of the release, track or song names, release genre, and the name of the musical artist, which may possibly be non-unique, ambiguous with respect to similar or identical names of one or more different artists, or otherwise less-than-definitive in one way or another or for one reason or another. A musical release may also include associated artwork, such as an album cover, for example. The items and/or components of a release may take the form of a data record, or release data record, and may be stored in a release database, for example.

The artist name associated with a release may generally be the name by which the artist is publically and/or commercially known. While it may or may not be the artist's true legal or given name, it may typically be the name under which the artist releases music and/or by which the artist is known to fans or consumers, for example. There could be various reasons why the artist name associated with a release record may be non-unique, ambiguous, or otherwise less-than-definitive. For example, the artist may use more than one spelling, or more than one form of his or her name (e.g., with and without a middle initial). Various musical artists could have the same or similar names. Additionally, an artist's name may be misspelled in a particular release record. There could be other reasons as well. In order to account for these and other possible reasons and/or scenarios related to artist name, the term "sub-definitive musician name" or "sub-definitive artist name," or the like, is used herein to refer to a possibly non-unique, ambiguous, or otherwise less-than-definitive artist name in a release record. It should be noted that while the sub-definitive artist name in a release record may generally be non-unique or ambiguous, it could, in fact, be unique in some instances.

In a release database, release records having the same unique artist ID are all associated with releases by the same artist. As such, the unique artist ID may serve as a definitive identifier of all releases by the same actual artist. However, those same releases may not necessarily all have the same sub-definitive artist name, and even if they do, that sub-definitive artist name may nevertheless be non-unique and/or ambiguous with respect to a different actual artist having the same or similar name. Thus, in practice, the sub-definitive artist name may not necessarily serve as a unique identifier of all releases by the same artist. And, more particularly, sub-definitive artist names may not necessarily definitively distinguish between different actual artists and their respective associated releases.

One operation of maintaining and updating a release database involves adding new music submitted by an artist or an artist's representative (or other proxy, for example) to a music content provider or distribution service. In practice, artists who submit music (e.g., single or multiple tracks, for example) may range for unknown to well-known. New submissions may typically include music (audio) media, some descriptive metadata, and an artist name associated with the submission. New submissions do not include unique artist IDs, since these are constructs of the release database, and are generally determined by the owner and/or operator of the release database. In order to make a new musical submission available for end-user consumption (e.g., streaming or downloading), a new release record first needs to be created and added to the release database, based on the data of the new submission and guidelines for the release database.

A particular challenge in creating a new release record for a new submission is correct determination of a unique artist ID for the new release record. Specifically, based on artist name alone, it may not necessarily be possible to exactly match an artist name of a new submission with similar sub-definitive artist names of release records, or to even be certain that two closely or exactly matching names even correspond to the same actual artist. That is, a submission artist's name alone may be insufficient to definitively determine a correct unique artist ID—whether from among existing ones in the release database or a new one if the submission artist doesn't already have any releases in release database. This challenge may be generally described as ambiguity of artist name with respect to definitive identification of the correct actual artist. Correspondingly, the process of correctly pairing an artist name with the correct actual artist may be referred to generally as disambiguation.

A conventional approach to creating new music release records for new music submissions—and in particular, determining the correct unique artist ID—involves manual curation of the new submissions and of the release database. Specifically, a human curator (e.g., database manager, submission manager, or the like) may first try to identify candidate matches between a new submission and one or more existing releases, based on name similarities (or exact matches), for example. Then, the curator may review and/or evaluate various characteristics of metadata associated with both the submission and the candidate releases. For example, the genre of the submission and of the candidate releases may help rule out or favor possible matches. A human curator may also consult external media or tools, such as online or print magazines, or websites, for example, in order to help establish matches. Similarly, titles, artwork, artist biographies, and the music media content itself may provide guidance as well. In any case, however, the conventional approach is typically tedious and inefficient, particularly for a release database containing thousands, tens of thousands, or even millions of release records, and for similar numbers of new submissions over time.

Accordingly, there is a need for automated, rapid, and efficient disambiguation of artist names in music releases. In view of this need, and the challenges to conventional approaches to disambiguation, the inventors have recognized that machine learning (ML) techniques implemented by one or more computing devices or systems may be used to recognize similarities and differences among various characteristics of music releases in a release database. The inventors have further determined how the recognized similarities and differences may be used to analytically create separate and distinct regions in a multi-dimensional vector space of characterizing features, with each region representing a "cluster" of release "feature vectors" of releases by the same actual artist (i.e., with the same unique artist ID). When a new submission is received, it may be similarly analyzed to generate a characterizing submission feature vector, which may then be evaluated for possible membership in an existing cluster—and identification with the unique artist ID of the cluster—or establishment of a new cluster and a new unique artist ID. In example embodiments, a multi-modal artificial neural network (ANN) may be used to construct a ML predictor model that provides a framework for systems and methods for automated disambiguation of musical artist names. The techniques described herein may be extended to address other circumstances in which similar types of ambiguity arise, and similar forms of disambiguation may be used to address them. For example, releases could correspond to music videos and/or movies, and disambiguation could be applied to determining associated unique IDs, such as artist ID for music videos, or directors, actors, and/or production studios for movies. These are just some examples of possible extension of musical artist disambiguation embodiments described herein.

II. Architecture

A. Example System for Automated Disambiguation of Artist Names

FIG. 1 is a simplified operational block diagram of an artist-name disambiguation system 100 that may be configured to automate disambiguation of artist names. The artist-name disambiguation system 100 can include various components, any one or more of which may be implemented as or in one or more computing devices. As such, components of the artist-name disambiguation system 100 may themselves be or include hardware, software, firmware, or combinations thereof. Some of the components of the artist-name disambiguation system 100 are identified structurally, such as databases or other forms of data storage and management, and others are identified in terms of their operation or function. Operational and/or functional components could be implemented as software and/or hardware modules, for example, and will sometimes be referred to herein as "modules" for the purpose of the present discussion.

Non-limiting example components of the artist-name disambiguation system 100 include an artist-release records database 102, release vector ML predictor model 104, iterative cluster/anti-cluster module 106, release vector cluster database 108, runtime unassigned artist submissions database 110, and release vector cluster-matching module 112. In addition, FIG. 1 depicts a number of data elements or constructs that are generated by and passed between system components. These are described below in the context of example operation.

The artist-name disambiguation system 100 can also include one or more connection mechanisms that connect various components within the system 100. By way of example, the connection mechanisms are depicted as arrows between components. The direction of an arrow may indicate a direction of information flow, though this interpretation should not be viewed as limiting. As described below, the automated music release disambiguation system 100 may operate in a training mode and/or a runtime mode. For purposes of illustration, connection mechanisms that serve training operation are depicted with dashed lines, while connection mechanisms that serve runtime operation are depicted with solid lines.

In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Generally, a ML predictor model described herein, such as the artist-name disambiguation system 100, may operate in two modes: training mode and runtime mode. In training mode, the artist-name disambiguation system 100 may be "trained" to generate release vectors from input release records, and analytically cluster release vectors of the same actual artist (as identified by the unique artist ID) in a particular region of feature-vector space, while also separating clusters associated with different artists. In runtime mode, the artist-name disambiguation system 100 may operate to generate submission vectors from input submissions, and to either assign them to an existing cluster if they are closer to them than a threshold distance, of form a new cluster if they are further than the threshold from any existing cluster. If assigned to an existing cluster, the submission may thus be determined to have the same actual artist (and unique artist ID) as the cluster. If a new cluster is established, the submission may thus be determined to be that of a previously unidentified artist.

Example operation of the artist-name disambiguation system 100 may be understood in more detail as follows. During training operation, depicted above the horizontal dashed line 101, n-tuples of artist release records 103 from the artist-release records database 102 may be input to the release vector ML predictor model 104, where n≥2. More particularly, artist release records are input in groups of n records at a time (i.e., one n-tuple of records at a time), and the release vector ML predictor model 104 carries out processing on each of the n input release vectors concurrently, generating corresponding n-tuples of predicted release vectors 107, each being generated one n-tuple at a time. For each n-tuple of input records 103, the output n-tuple of predicted release vectors 107 is input to the iterative cluster/anti-cluster module 106, which also receives from the artist-release records database 102 a corresponding n-tuple of unique artist IDs 105, which serve as ground truths for clustering or anti-clustering of the n-tuples of predicted release vectors 107.

More specifically, for each two or more predicted release vectors of an n-tuple that are associated with the same artist ID, the iterative cluster/anti-cluster module 106 will attempt to adjust parameters 106-A of the both the ML predictor model 104 and of the n-tuple of predicted release vectors generated by the model in a manner that tends to increase clustering. Conversely, for each two or more predicted release vectors of an n-tuple that are associated with the different artist IDs, the iterative cluster/anti-cluster module 106 will attempted to adjust parameters 106-A of the both the ML predictor model 104 and of the n-tuple of predicted release vectors generated by the model in a manner that tends to decrease clustering—or "anti-cluster" predicted vectors of different artists.

The training operation may be carried out on all possible n-tuples of all or at least some of the artist release records in the database 102. Since there can be multiple different releases by the same artist, as well as different releases by different artists, and n≥2, each n-tuple may include at least one pair of records by the same artist, and/or one pair by two different artists. Depending on the size of n, the number of release records, and the frequency of a given artist ID in the release records, each n-tuple may include all n records by the same artist, all n by different artists, or some combination thereof. That is, at least one n-tuple will include all n records by the same artist, provided there are at least n records by the same artist in the database. Similarly, at least one n-tuple will include all n records by n different artists, provided there are at least n different artists in the database. And for n>2, at least one n-tuple will include two records by the same artist and at least one by a different artist, provided there are at least two records by the same artist and at least one more record by a different artist in the database. In practice, and for practical reasons, only value of n=2 and/or n=3 may be used, though this is not a requirement or limitation of example embodiments herein. For n=2, each n-tuple will be a pair; for n=3, each n-tuple will be a triplet.

Through the training process just described, clusters of predicted release vectors in a multi-dimensional feature vector space may be formed. The feature vector of a given release may be considered quantitative characterizations of data associated with the release. These data may include metadata as well as actual audio (music) content. The clusters formed by this process may be stored or recorded in release vector clusters database 108, and the training release vectors 109 generated from the training process may be added to their corresponding release records in the artist-release records database 102. Other arrangements are possible as well. For example, the release vector clusters database 108 may be part of the artist-release records database 102, and/or the training release vectors 109 may be stored separately from their corresponding records. Further, the clusters may not necessarily be stored as such, but may rather be derivable from information stored in the artist-release records database 102 after training.

During runtime operation, depicted below the horizontal dashed line 101, a runtime artist submission 111 from the runtime unassigned artist submissions database 110 may be input to the ML predictor model 104, which may generate a runtime predicted release vector 113, which could also be described as, or designated, a submission vector. The runtime predicted release vector 113 may be input to the release vector cluster-matching module 112, which also receives the runtime artist submission 111 from the runtime unassigned artist submissions database 110. The release vector cluster-matching module 112, by consulting the release vector clusters database 108, may determine whether to associate the runtime predicted release vector 113 with an existing cluster, or to establish a new cluster having, for the moment, just the runtime predicted release vector 113 as a member. In the former case, the runtime artist submission 111 may be identified with the particular artist associated with the existing cluster, and a new release record for the particular artist created. In the latter case, the runtime artist submission 111 may be identified with a new artist associated with the new cluster, and a new release record for the new artist created. In either case the new record runtime artist-release record and associated artist ID plus associated release record 115 may be added to the artist-release records database 102.

The runtime processing may be carried automatically for each new submission received and/or acquired by a content provider or content distributor that uses and/or implements the artist-name disambiguation system 100. Note that the source of new submissions need not necessarily be a database, such as the runtime unassigned artist submissions database 110. Other input sources, such as a direct user application available to submitting artists could be used as well. The training process could also be re-run from time to time to tune or enhance the cluster data, for example. Additionally, although not explicitly shown in FIG. 1, the artist-name disambiguation system 100 may also include one or more interactive user interfaces for a manager or curator to check and/or tune/adjust results in order to help improve overall performance. For example, by review release records from time to time via a user interface, a human curator may detect erroneous artist ID assignments and correct them.

Further details of the release vector ML predictor model 104 and of the training process are described in a later section of the present disclosure.

As noted, the artist-name disambiguation system 100 and/or components thereof can take the form of, be part of, or include or encompass, a computing system or computing device. Before describing example operation of an example automated banner generation system, an example of a computing system or device is first described.

B. Example Computing System

Figure 2:
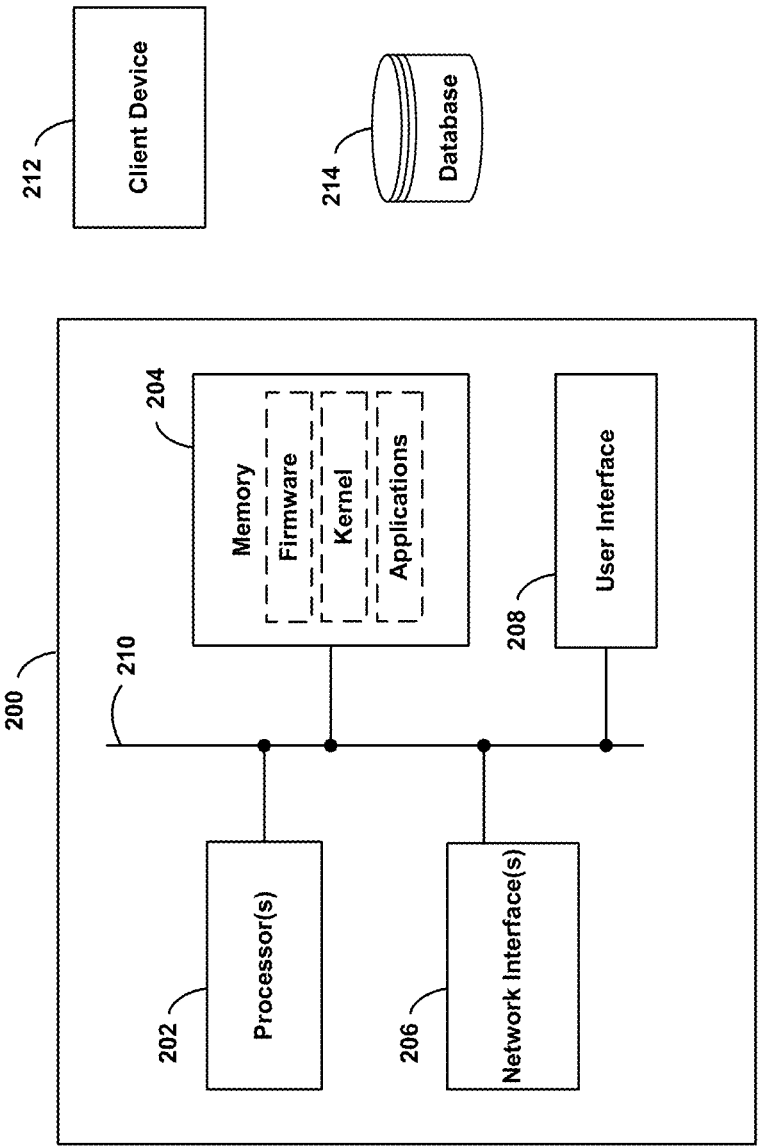
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code or non-transitory computer-readable storage media, that may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker. In an example embodiment, the client device 212 may provide user interface functionalities.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Client device 212 may be a user client or terminal that includes an interactive display, such as a GUI. Client device 212 may be used for user access to programs, applications, and data of the computing device 200. For example, a GUI could be used for graphical interaction with programs and applications described herein. In some configurations, the client device 212 may itself be a computing device; in other configurations, the computing device 200 may incorporate, or be configured to operate as, a client device.

Database 214 may include storage for input and/or output data, such as the artist-release records database 102, the release vector cluster database 108, and/or unassigned artist submissions database 110, for example.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

III. Example Operations

A. Artist Release and Artist Submission Data Architecture

In keeping with the example of online music content and music content providers and distribution services, example data architectures of artist release records and artist submissions will be illustrated by example records for music, and generally referred to herein as "musical-artist-release records" or MARRs, and "musical submission records," respectively. Note that sometimes "release record" will be used for a MARR, and sometimes "submission record" will be used for musical submission record. Also, just the term "release" may be used to refer to a collection of data that makes up a release record. Similarly, just the term "submission" may be used to refer to a collection of data that makes up a submission record. Examples of a MARR and a musical submission record are shown in FIGS. 3 and 4, and described below.

Figure 3:
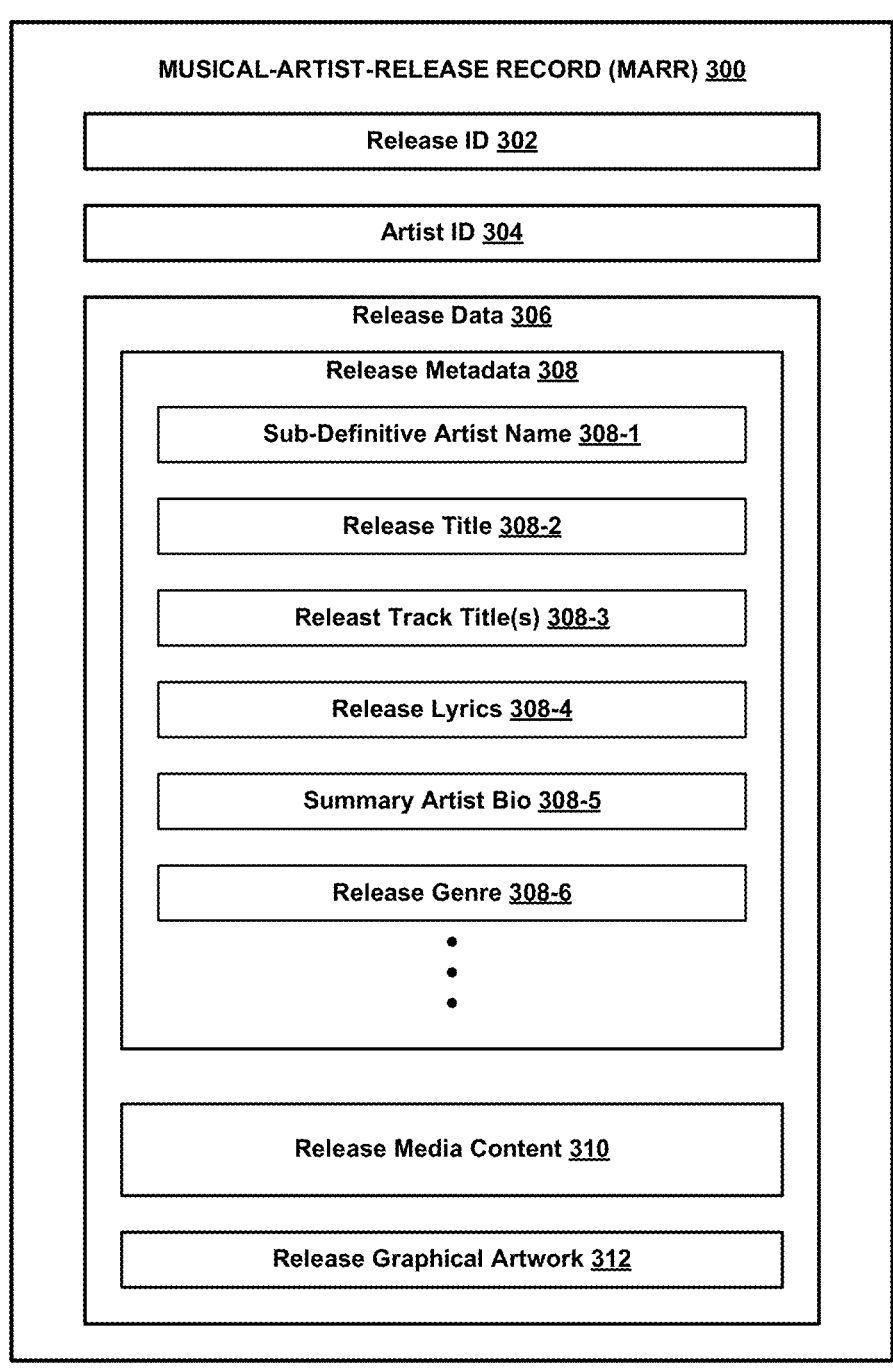
FIG. 3 illustrates an example musical-artist-release record, in accordance with example embodiments.
Figure 4:
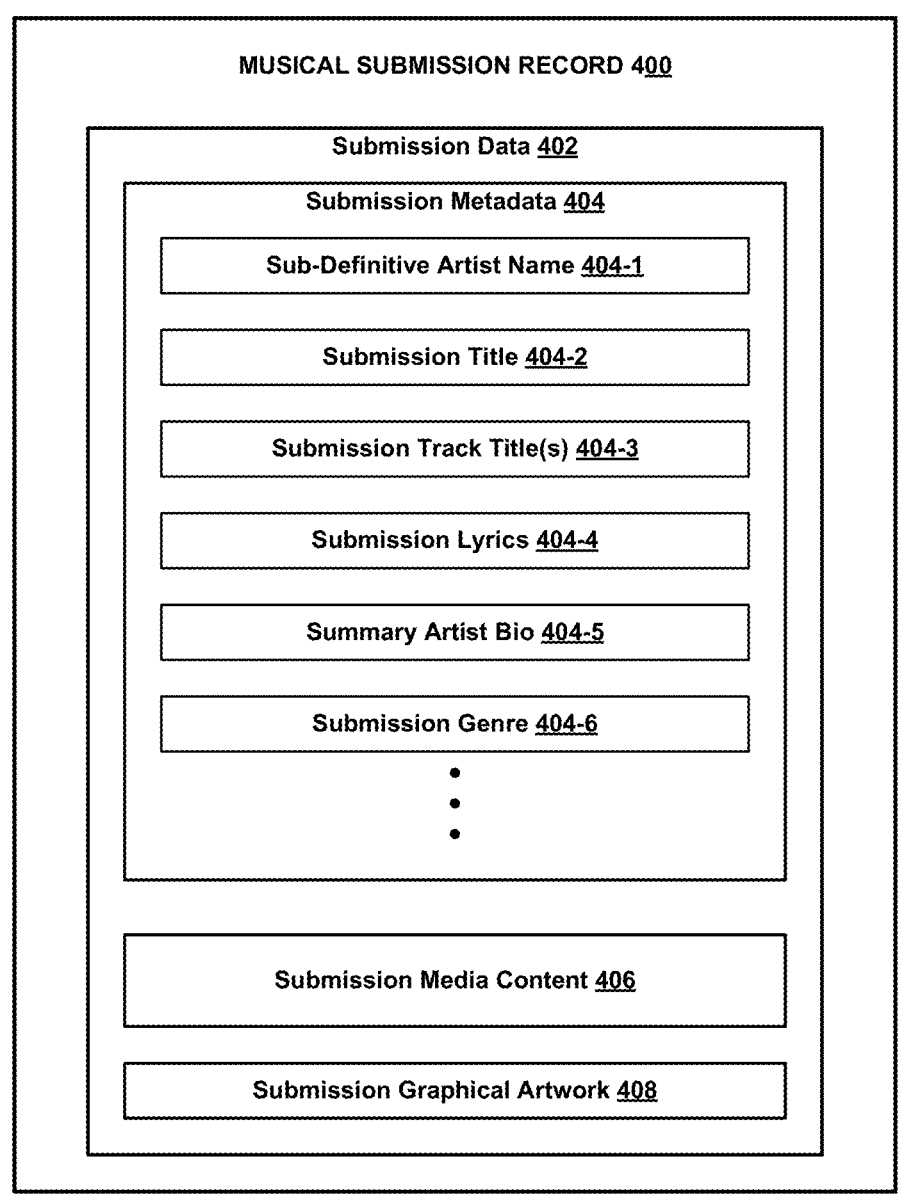
FIG. 4 illustrates an example musical submission record, in accordance with example embodiments.

FIG. 3 illustrates an example musical-artist-release record (MARR) 300, in accordance with example embodiments. The MARR 300 includes a release ID 302, an artist ID 304, and release data 306, which includes release metadata 308, release media content 310, and release graphical artwork 312. The release ID and artist ID are both unique among MARRs managed by a music content provider or distribution service. The release media content 310 in the MARR 300 could be actual media files, or pointers to media files. The media files may take the form of audio music files or tracks, in one or another know digital audio media format, for example. Other arrangements are possible as well. The graphical artwork 312 may take the form of digital image or graphics files, for example.

In the example MARR 300, the release metadata 308 includes a sub-definitive artist name 308-1, a release title 308-2, release track title(s) 308-3, release lyrics 308-4, a summary artist biography 308-5, and a release genre 308-6. There could be fewer, more, and/or different types of metadata as well. The vertical ellipses in the FIG. 3 indicate additional metadata fields may be possible. The source of the metadata may typically be a corresponding submission record, though some fields, such as genre may be determined and/or set in the process of creating the MARR. For example, genre may be derived using classification algorithms applied to other data, such as audio or video. Other metadata could include language of tracks, which could also be used in classifying derived fields.

For any given MARR 300 in a release database, for example, there may be some data fields that are not set. This could be for various reasons, a common or likely one being that a musical submission record used to create the MARR does not provide or include some information. For example, a musical submission by an artist may not have included a summary biography of the artist, lyrics, and/or artwork. Even a title may have been omitted in the submission. Thus, some of the defined data fields may not have any value(s) when the submission was made. In some instances, one or more data fields may be set erroneously, such as with an incorrect genre or typographical error. However, all MARRs will have at least a release ID and artist ID, since these are set as part of the process that creates MARRs. Additionally, it may be assumed that all MARRs have associated media content, since this makes up the artist's actual creative product. All MARRs may also be assumed to have a sub-definitive artist name, since this is the way an artist is identified in a submission, and is also the information that needs to be disambiguated.

FIG. 4 illustrates an example musical submission record 400, in accordance with example embodiments. The submission record 400 includes submission data 402, which in turn includes submission metadata 404, submission media content 406, and submission graphical artwork 408. The submission media content 406 may take the form of audio music files or tracks, in one or another know digital audio media format.

In the example submission record 400, the submission metadata 404 includes a sub-definitive artist name 404-1, a submission title 404-2, submission track title(s) 404-3, submission lyrics 404-4, a summary artist biography 404-5, and a submission genre 404-6. There could be fewer, more, and/or different types of metadata as well. The vertical ellipses in the FIG. 4 indicate additional metadata fields may be possible. The source of the metadata will typically be provided by the artist or person who makes the submission to an online music content service, such as a music content provider or distribution service, for example.

As with the MARR 300, there may be some data fields of a submission record 400 that are not set. This could be for various reasons, a common or likely one being that the artist or person who created the submission omitted certain fields. For example, a musical submission may have omitted a summary biography of the artist, lyrics, and/or artwork. Even a title may have been omitted in the submission. Thus, some of the defined data fields may not have any value(s). However, it may be assumed that all submission records have associated media content, since this makes up the artist's creative product. All submission records may also be assumed to have a sub-definitive artist name, since this is the way an artist is identified in a submission.

The structure and organization of the MARR 300 and the submission record 400 in FIGS. 3 and 4 are presented by way of example. The particular structures shown should not be considered limiting with respect to example embodiments herein. Other arrangements and/or organizations of the MARR 300 and/or the submission record 400 may be possible as well.

As described above, when a submission is processed in order to create a release record, the sub-definitive name of the artist needs to be disambiguated with respect to existing release records. It should be noted that a submitting artist may not necessarily consider his or her name to be sub-definitive in the sense defined herein. That is, the submitting artist may likely consider the artist name entered with the submission to simply be his or her name—at least his or her name for purposes of association with his or her music submissions. In any case, the artist name associated with a new submission needs to be disambiguated in order to create a new, corresponding release record. And as described above, the term "sub-definitive" is defined within the context of MARRs, submission records, and disambiguation in order to signify the potential for ambiguity with respect to existing, uniquely identified artists.

Figure 5:
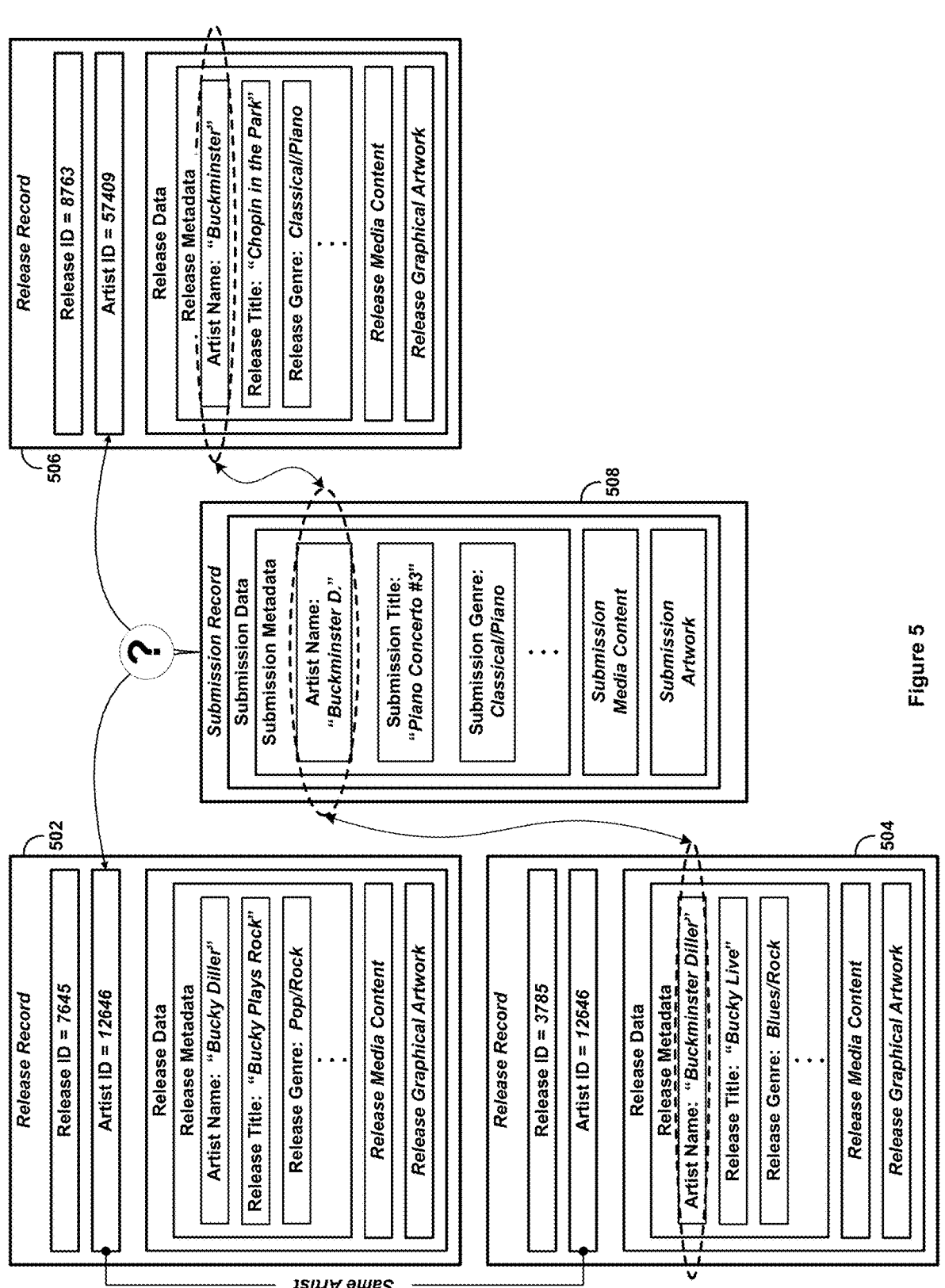
FIG. 5 illustrates an example scenario of musical-release ambiguity, in accordance with example embodiments.

FIG. 5 illustrates an example scenario of musical-release ambiguity, in accordance with example embodiments. As shown, the example scenario includes two release records 502 and 504 associated with the same artist ID of "12646," and one release record 506 associated with an artist ID of "57409." The release IDs of release records 502 and 504 are "7645" and "3785," respectively. The release ID of release record 506 is "8763." These identification number are examples having no particular significance other than illustrative purposes and to indicate that the artist IDs are unique to a given artist, and the release IDs are unique among all release records.

Also shown in FIG. 5 is a submission record 508 for an artist named "Buckminster D." This name represents the artist's own chosen name for the submission, and corresponds to a sub-definitive artist name in the context of disambiguation. Comparison of artist name in the submission record 508 with the sub-definitive artist names in the release records 502, 504, and 506 illustrates an example of artist-name ambiguity. Comparison of other data fields in the submission record 508 with similar fields in the release records 502, 504, and 506 can illustrate how disambiguation may be achieved.

By way of example, the artist name associated with release records 502, 504, and 506 are "Bucky Diller," "Buckminster Diller," and "Buckminster," respectively. The artist name in the submission record 508 is "Buckminster D." These names, devised herein for illustrative purposes, show how the same artist evidently goes by different exact names in different releases. It should be understood that this may not always be the case. But more particularly, comparison of "Buckminster D." in the submission record 508 with "Buckminster Diller" and "Buckminster" in release records 504 and 506 illustrates a potential ambiguity in determining whether the submission of submission record 508 should associated with the artist IDs 12646 or 57409. The ambiguity is indicated in FIG. 5 by the question mark ("?") overlaid on branching arrows from the submission record 508 to the artist IDs in release records 502 and 506. Dashed ovals highlighting the artist names in release records 504 and 506, and in the submission record 508 also provide visual cues of the artist name ambiguity illustrated in this example. Note that while there may appear to be less (or even little) ambiguity between "Buckminster D." and "Bucky Diller" in release record 502, the existence of release record 504 with "Buckminster Diller" nevertheless may create the ambiguity of this example.

Inspection of other data in the release records and the submission record may be used to help resolve the ambiguity, and thereby disambiguate the artist name. Specifically, and by way of example, the release genres of release records 502 and 504 are "pop/rock" and "blues/rock." This is evidently consistent with both release records 502 and 504 being associated with the same musical artist. The release genre of the release record 506 is "classical/piano." This appears to be consistent with release record 506 being associated with a different artist. Similarly, the release titles of release records 502 and 504 are again consistent with both release records 502 and 504 being associated with the same musical artist, while the release title of release record 506 is consistent with this record being associated with a different artist.

As indicated, the submission genre of the submission record is "classical/piano," thus suggesting that the submission record should be associated with the same artist ID as release record 506. The submission title further supports this suggestion. This comparison of metadata in the submission record with similar metadata in the release records illustrates how artist name disambiguation may be achieved. Comparing the actual music media in the submission record and the release records may also serve to disambiguate artist name.

This example disambiguation illustrates conceptually how artist name disambiguation may be accomplished. As described, the process may seem relatively simple, and achievable by manual inspection. But the apparent descriptive simplicity belies the practical consideration that a typical online music service may host and/or manage hundreds of thousands or even many millions of release records, and may also receive similar numbers of submissions over time. In these volumes, disambiguation by manual inspection or curation becomes not only tedious, but practically impossible. Accordingly, example embodiments herein provide systems and methods for automating the disambiguation process, and advantageously turn a nearly impossible task into a fast and efficient one well-suited for large volumes of releases and submissions.

B. Example Artificial Neural Network

As described above, a ML model employing a multi-modal neural network may be applied to release records during training to generate release vectors that each characterize the record data, and to cluster in vector space release vectors associated with the same artist ID, while separating cluster associated with different artist IDs. At runtime, the trained model may be applied to submission records to similarly generate submission vectors, which may then be assigned to an existing cluster and its associated artist ID, or to establish a new cluster and a new associated artist ID.

In accordance with example embodiments, a multi-modal ANN may include multiple component ANNs, each trained to generate a respective sub-vector characterizing a respective component of release-record data. For example, component ANNs may respectively generate sub-vectors characterizing release artist name, release name, release track name(s), release genre, and release media content, among other and/or different data components. The sub-vectors may then be concatenated into a release vector, which may then be adjusted, together with parameters (e.g., weights) of the multi-modal ANN, in the clustering/anti-clustering process.

Figure 6:
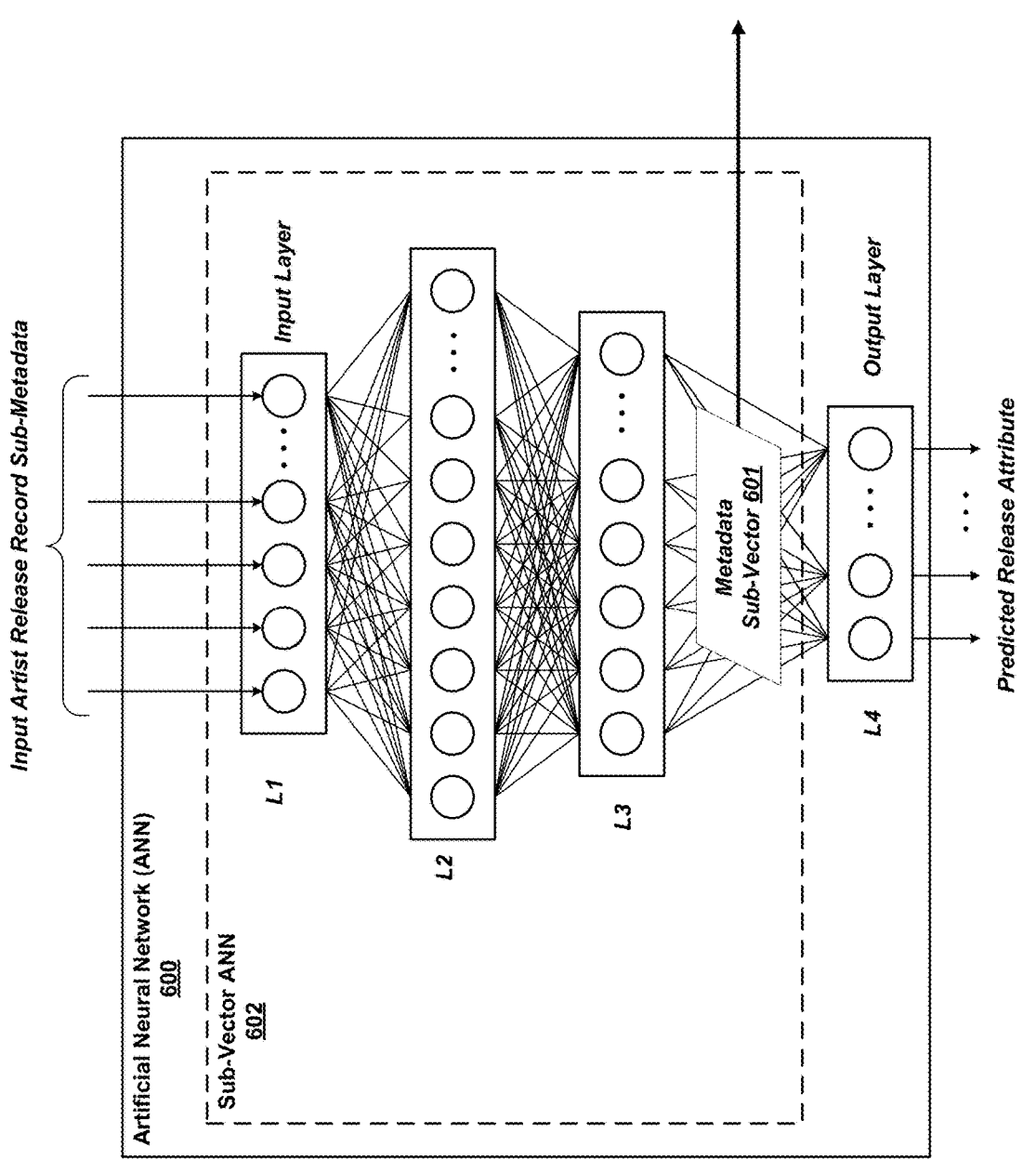
FIG. 6 is an example architecture of an example artificial neural network, in accordance with example embodiments.

FIG. 6 illustrates an example architecture of an example artificial neural network 600, in accordance with example embodiments. As shown, the ANN 600 may be computationally constructed as a plurality of interconnected layers, including an input layer (labeled "L1"), an output layer (labeled "L4"), and one or more intermediate layers (labeled "L2" and "L3" in this example). Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, for example, may involve inputting training data that represents known (training) examples of the particular class of content for which results are known, and then adjusting parameters (or weights) of the nodes in a feedback-like procedure to maximize a probability that a predicted output by the ANN output (e.g., what the ANN "thinks" the input data represents) matches the training examples.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML predictors described herein may include or employ either or both types of ANN implementations, in accordance with the descriptions below. Further, other types of ANNs are possible, and may be used or included in example embodiments of ML predictors described herein.

In accordance with example embodiments of automated artist disambiguation, a component ANN of a multi-modal ANN may be trained by inputting a particular component of release record metadata, designated "input artist release record sub-metadata" in FIG. 6. The output of the component ANN may be an attribute of the release, designated "predicted release attribute," which may be evaluated against a corresponding ground truth during training.

In an example implementation, a component ANN may generate a metadata sub-vector 601 as an intermediate training (or more generally, processing) step. That is, while the component may be trained to predict an attribute of a release that is in close statistical agreement with a ground truth, a sub-vector characterizing the input sub-metadata may be produced by one of the intermediate layers. In the example of FIG. 6, the layer just before the output layer generated the metadata sub-vector 601. However, in other arrangements, a different intermediate layer might produce the metadata sub-vector. As indicated in FIG. 6, all of the layer up through the intermediate layer that produces the sub-vector are collectively designated a sub-vector ANN 602.

It should be noted that while the sub-vector ANN 602 is shown as operating on a component of release record metadata, it may similarly operate on other data, besides metadata, of a release record. For example, a sub-vector ANN could generate a sub-vector for media content or release artwork. Additionally, the inputs to the sub-vector ANN 602 may also be data that are derived from metadata, rather than actual or specific metadata. For example, a classification algorithm may be applied to metadata in order to derive a particular characteristic, which may then be the input to the sub-vector ANN 602.

It should also be noted that while the ANN 600 and sub-vector ANN 602 are examples of a fully-connected, feed-forward network, other types of ANNs may be used in accordance with example embodiments. Further, different types of ANN architectures may be used for different component ANNs of a multi-modal ANN. The type of ANN architecture used for a particular component ANN may be determined according to the type of data input to the component ANN and/or the type of predicted release attribute it generates. For example, recurrent neural networks, such as long short-term memory (LSTM) and gated recurrent units (GRUs), may be well-suited for text input data, while convolutional neural networks (CNNs) may be better for image and/or audio input data. Both types, possibly as well as others, could be used in a multi-modal neural network of a disambiguation system, in accordance with example embodiments.

The training of a component ANN described above may be considered a form or pre-training of a multi-modal ANN used for artist name disambiguation. More particularly, the pre-training may be used both to train each of multiple component ANNs of a multi-modal ANN to generate a sub-vector, and to provide initial estimates of weights for training the multi-modal ANN. As describe above, and explained in more detail below, the pre-trained component sub-vector ANNs may be aggregated or otherwise merged into the multi-modal ANN. Operationally, each component sub-vector ANN may generate its respective sub-vector, and all the sub-vectors may be concatenated into a release vector. Training of the multi-modal ANN may then be used to form clusters of release vectors. Runtime operation may be used to classify a submission vector according to its distance in vector space from the various clusters.

B. Example Training Architecture and Runtime Operation

Figure 7A:
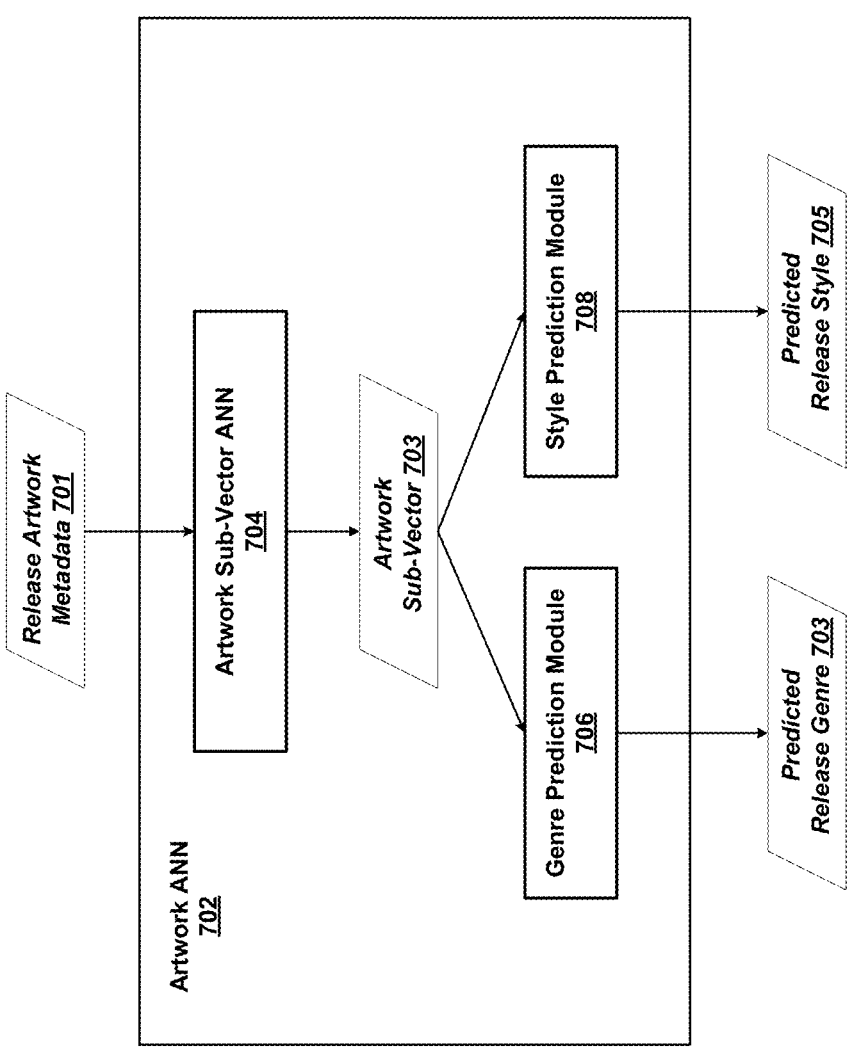
FIGS. 7A and 7B illustrate two examples of pre-training of artificial neural networks, in accordance with example embodiments.
Figure 7B:
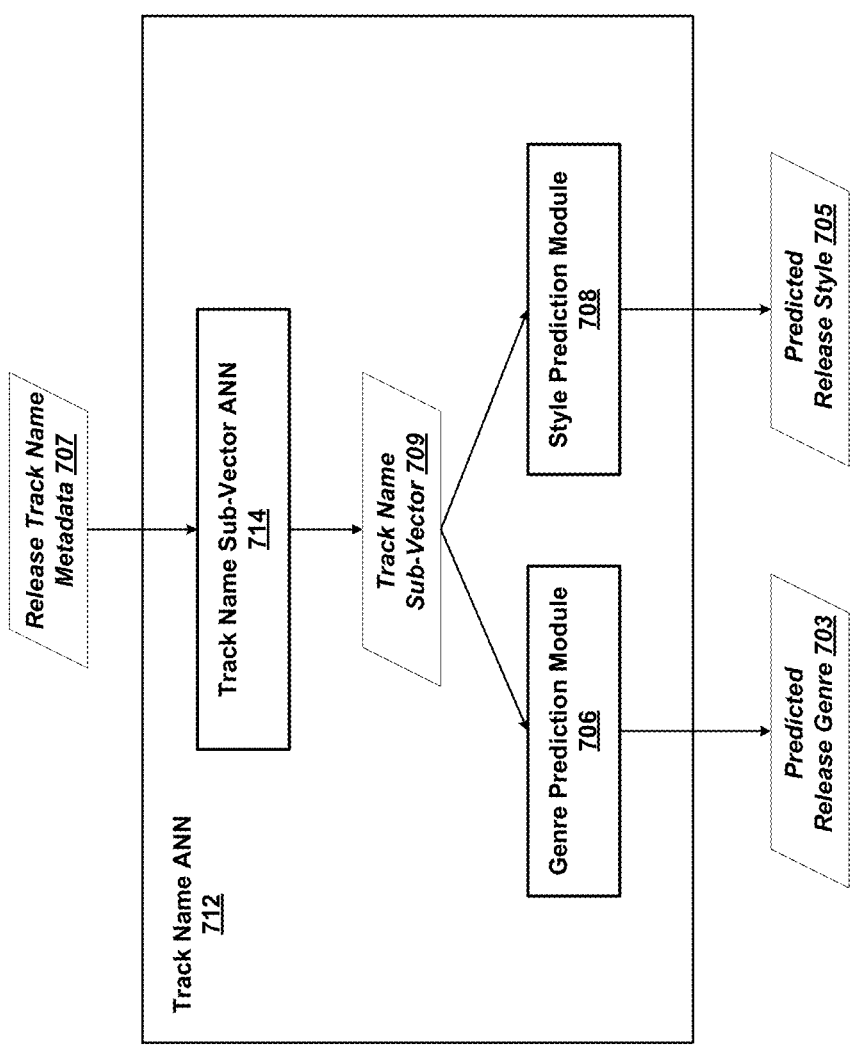

FIGS. 7A and 7B illustrate two examples of pre-training of artificial neural networks, in accordance with example embodiments. Each pre-training operation may apply to one of the data components of a release record, such as MARR 300 of FIG. 3, or the example release records of FIG. 5. More particularly, FIG. 7A shows an artwork ANN 702, which may be trained using release artwork metadata 701 of a given release record (not shown) as input to predict release genre 703 and release style 705. Both of the predicted attributes may be evaluated against ground truths corresponding to the actual values of these attributes in the given release record. In an example embodiment, a loss function may be used to train the artwork ANN 702.

As also shown, the artwork ANN 702 includes an artwork sub-vector ANN 704, which may generate an artwork sub-vector 703. The artwork ANN 702 may also include a genre prediction module 706 and a style prediction module 708, each of which predicts a respective attribute based on the artwork sub-vector 703. The pre-training "teaches" the artwork sub-vector ANN 704 to generate the artwork sub-vector 703.

FIG. 7B shows track name ANN 712, which may be trained using release track name metadata 707 of a given release record (not shown) as input to predict release genre 703 and release style 705. Again, both of the predicted attributes may be evaluated against ground truths corresponding to the actual values of these attributes in the given release record. In an example embodiment, a loss function may be used to train the artwork ANN 712.

As also shown, the track name ANN 712 includes a track name sub-vector ANN 714, which may generate a track name sub-vector 709. The track name ANN 712 may also include a genre prediction module 706 and a style prediction module 708, each of which predicts a respective attribute based on the track name ANN 712. The pre-training "teaches" the track name sub-vector ANN 714 to generate the track name sub-vector 709.

Each of the artwork ANN 702 and the track name ANN 712 may be implemented using an ANN, such as the ANN 600 in FIG. 6. Similarly, each of the artwork sub-vector ANN 704 and the track name sub-vector ANN 714 may be implemented using a sub-vector ANN, such as the sub-vector ANN 602 also in FIG. 6. Component ANNs of a multi-modal ANN may be constructed for the other data components, including sub-metadata components, of a release record.

Figure 8:
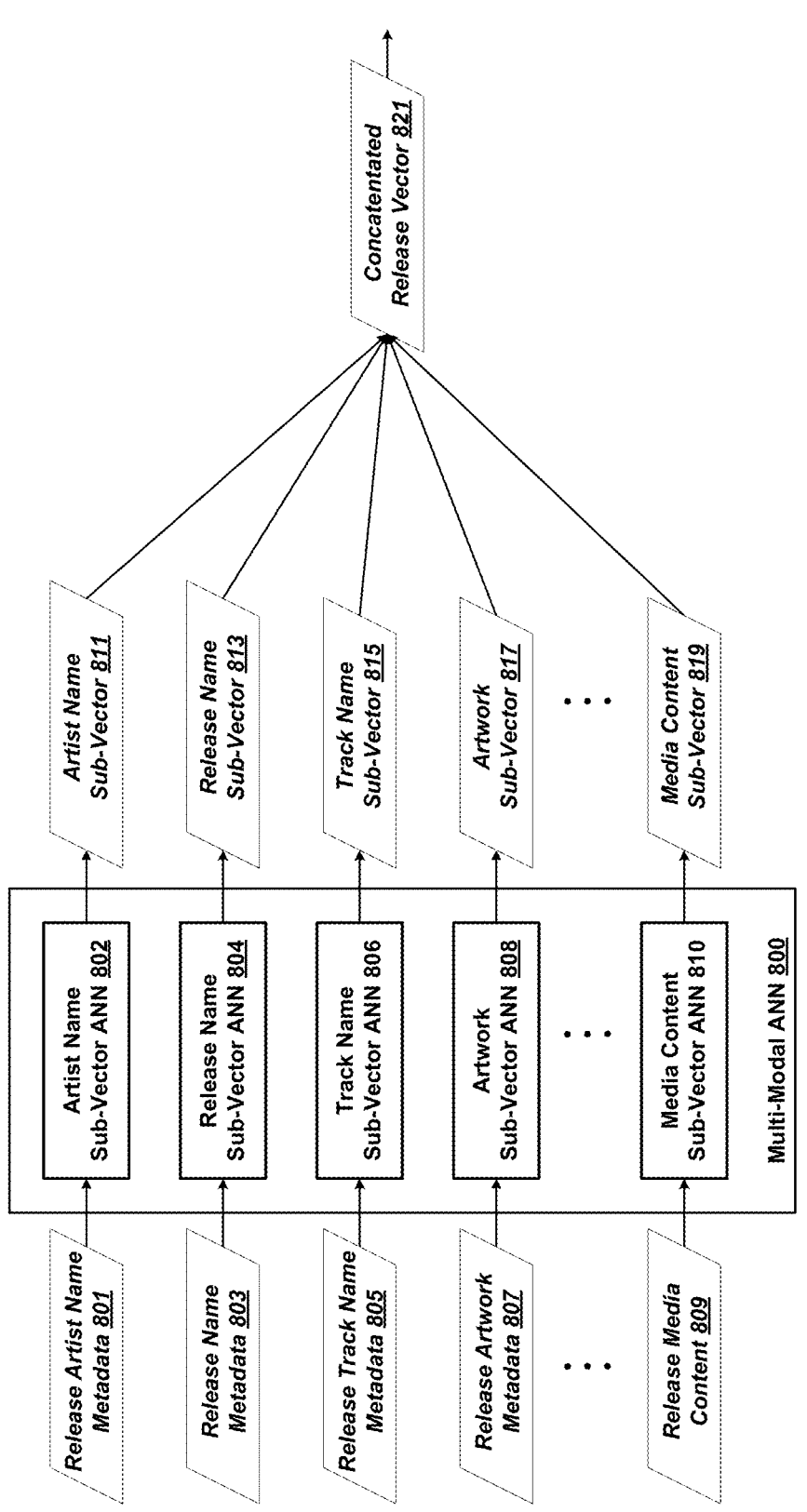
FIG. 8 illustrates an example multi-modal neural network for generating a release vector, in accordance with example embodiments.

FIG. 8 next shows an example multi-modal ANN 800 constructed from multiple sub-vector ANNs, such as the artwork sub-vector ANN 704 and the track name sub-vector ANN 714. By way of example, the multi-modal ANN 800 includes an artist name sub-vector ANN 802, a release name sub-vector ANN 804, a track name sub-vector ANN 806, an artwork sub-vector ANN 808, and a media content sub-vector ANN 810. There could be additional sub-vector ANNs as well, as indicated by the vertical ellipses.

In operation, a release record including data components such as those of the release record 300, may be input to the multi-modal ANN 800. Upon input, each data component may be processed by a respective, associated sub-vector ANN that generates a respective, corresponding sub-vector.

The sub-vectors may then be concatenated into a release vector associated with the input release record. As shown in the example of FIG. 8, release artist name metadata 801 may be applied to the artist name sub-vector ANN 802 to generate an artist name sub-vector 811. Concurrently, release name metadata 803 may be applied to the release name sub-vector ANN 804 to generate release name sub-vector 813; release track name metadata 805 may be applied to the track name sub-vector ANN 806 to generate a track name sub-vector 815; release artwork metadata 807 may be applied to the artwork sub-vector ANN 808 to generate an artwork sub-vector 817; and release media content 809 may be applied to the media content sub-vector ANN 810 to generate a media sub-vector 819. The generated sub-vectors may then be concatenated into a concatenated release vector 821.

Generated in this way, the concatenated release vector 821 may be considered a release feature vector that characterizes the data of a release record. In practice, not all of the data components of a given release record may necessarily be set or have values, as described above. As such, some release feature vectors may more accurately characterize their associated release records than others. However, it may be expected that the release feature vectors generated by a multi-modal ANN will characterize a sufficient amount of their associated release record's data to yield reliable clustering through training of the multi-modal ANN.

As briefly described above, a multi-modal ANN such as multi-modal ANN 800 may be trained to both generate release feature vectors that characterize the data of associated release records, and cluster the generated release feature vectors in a multi-dimensional feature vector space according to unique artist IDs associated with the respective release records. The training procedure may accomplish these two results by adjusting both the weights of the multi-modal ANN and the generated release feature vectors themselves. In addition to clustering release feature vectors associated with identical artist IDs, the training procedure also attempts to separate as much as possible clusters associated with different artist IDs. The separation operation is referred to herein as "anti-clustering," as noted above.

In order to achieve both clustering and anti-clustering, the training procedure acts concurrently on n-tuples of release records, where n≥2. More particularly, using an existing collection of release records, such as artist-release records database 102, as a corpus of training data, every n-tuple grouping of release records that can be formed will include either two or more release records associated with the same artist ID, two or more release records associated with different artist IDs, or (if n>2) some combination. By concurrently training with a given n-tuple of release records and using the respective associated artist IDs as ground truths, the multi-modal ANN may learn to cluster and/or anti-cluster the release feature vectors of the given n-tuple, depending on the associated artist IDs. The clustering/anti-clustering results may be refined and enhanced by carrying out the training for all of the possible n-tuples of the training corpus. In practice, the corpus of training data may be a subset of the entire database of release records. For example, if the entire database includes 5 million release records, a corpus of training data could be constructed from a random or partially-random subset of 750,000 records. These numbers are non-limiting examples. Further, subset creation could involve a mix of random selection and specific criteria-based selection.

Figure 9A:
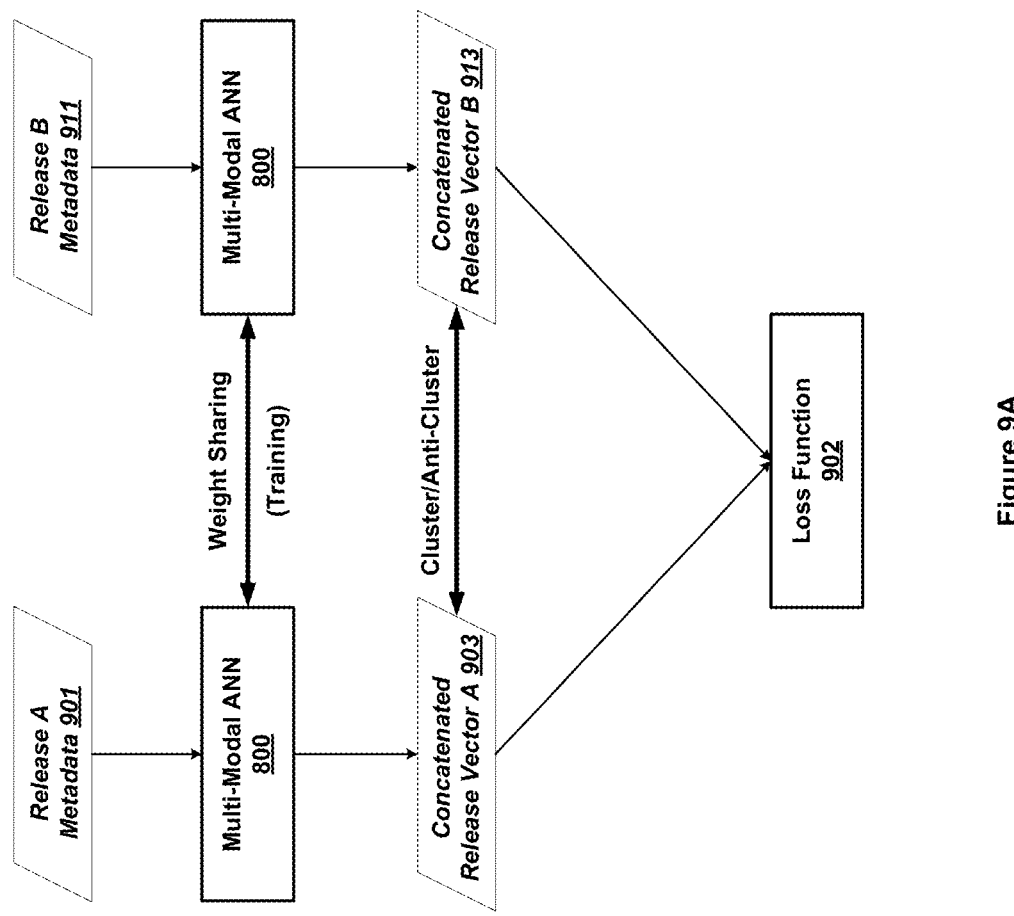
FIGS. 9A and 9B illustrate two examples of training a multi-modal neural network, in accordance with example embodiments.
Figure 9B:
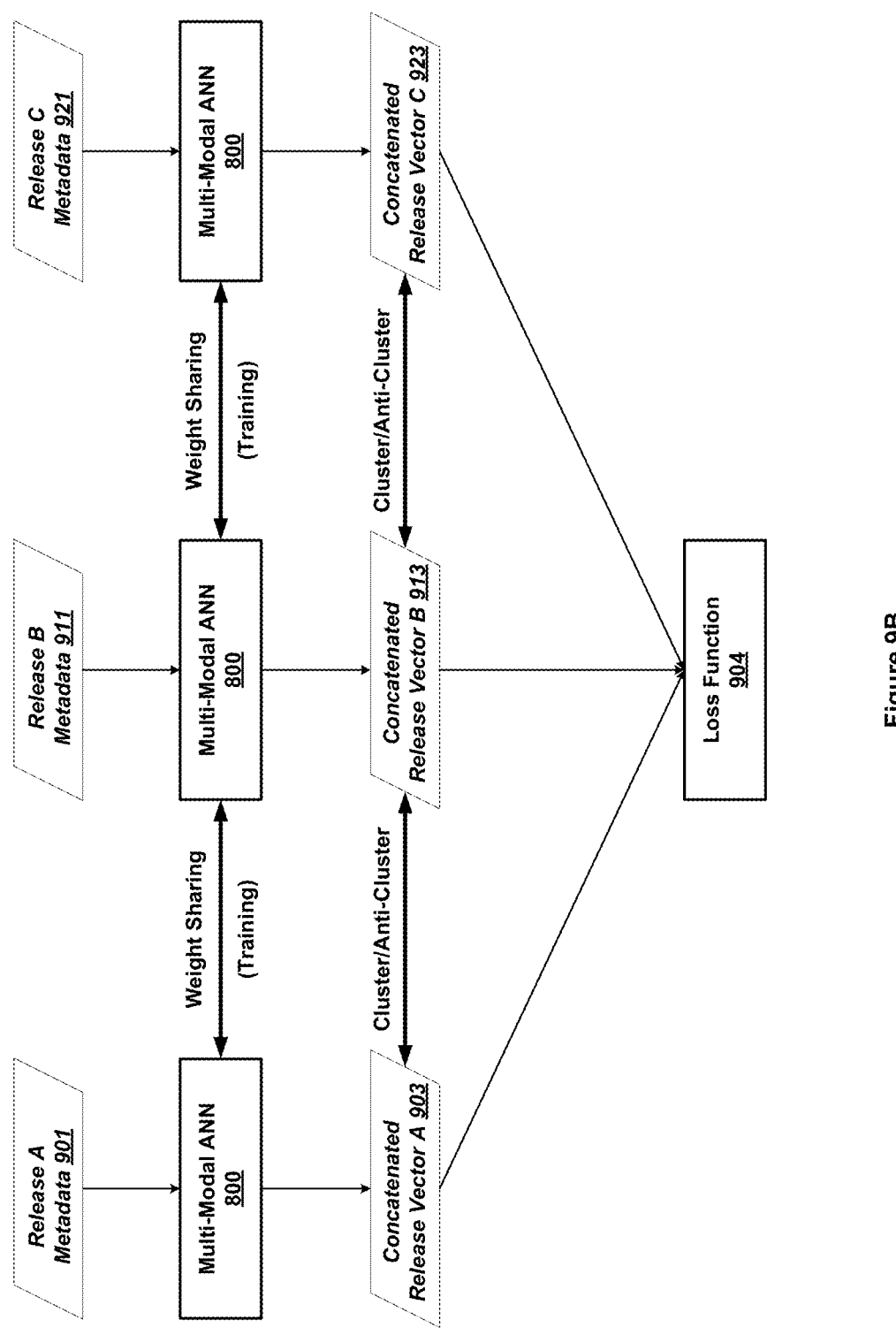

FIGS. 9A and 9B illustrate two examples of training a multi-modal neural network for n=2 and n=3, respectively, in accordance with example embodiments. For n=2, illustrated in FIG. 9A, each n-tuple is a pair of release records. As such, each pair may either include two release records, both associated with the same artist ID, or two release records, each associated with a different artist ID. For n=3, each n-tuple is a triplet of release records. As such, each triplet may, in general, include three release records, all associated with the same artist ID; three release records each associated with a different artist ID; or two release records associated with the same artist ID and a third associated with a different artist ID. In practice, the range of possible combinations in triplets may be restricted. For example, triplets could be restricted to two identical artist IDs and one different artist ID. Other configurations could be used as well. For n>3, there are more possible combinations of identical and different artist IDs. While example embodiments are not limited to n=2 or n=3, only these two examples are illustrated herein. It may also be noted that since training is carried out concurrently and in parallel for n release records at a time, the complexity of training may increase as n increases.

Training for n=2, as shown in FIG. 9A, involves applying the multi-modal ANN 800 concurrently and in parallel to two different release records, designated release A metadata 901 and release B metadata 911. As noted both records could be associated with the same artist ID or with two different artist IDs. The multi-modal ANN 800 generates a concatenated release vector A 903 for release A metadata 901, and concurrently generates a concatenated release vector B 913 for release B metadata 911. In an example embodiment, the concurrent, parallel generation of the two release vectors may involve invoking two instances of the multi-modal ANN 800. Through an iterative process that may involve sharing of weights between the two instances, and application of a common loss function 902, the multi-modal ANN 800 may be "tuned," and the release vectors A 903 and B 913 may be adjusted, such that the release vectors cluster if they are both associated with the same artist ID, or separate (anti-cluster) if they are each associated with a different artist ID.

The training process illustrated in FIG. 9A may be repeated for each possible pair of release records in a training database. Note that through repeated application of the training procedure to all of the possible pairs, the same release record will be subject to training and adjustment on more than one training iteration, since each release record will be paired multiple times, each time with a different one of the other release records. Thus, as the training process progresses, the release vector associated with a given release record may become more refined and accurate. That is, as the training process is applied to more and more pairs, the results may become more accurate and reliable. In particular, the accuracy and reliability during runtime operation on new submissions may increase with training. As such, confidence in runtime results may correspondingly increase with training.

More specifically, clusters in the multi-dimensional feature vector space may become better defined for like artist IDs, and more distinctly separated for unlike artist IDs. In the context of the multi-dimensional feature vector space, "defined" may be taken to correspond to a statistical spread (e.g., variance) of a distribution of the cluster members; "better defined" may then correspond to a narrower spread. Similarly, the more distinct the separation of any two clusters, the greater the distance between their respective statistical centers (e.g., distribution means) and, also, the smaller any statistical overlap of the respective distributions of the two clusters.

Training for n=3, as shown in FIG. 9B, involves applying the multi-modal ANN 800 concurrently and in parallel to three different release records, designated release A metadata 901, release B metadata 911, and release C metadata 921. As noted all three records could be associated with the same artist ID, with three different artist IDs, or with two different artist IDs. The multi-modal ANN 800 generates a concatenated release vector A 903 for release A metadata 901, and concurrently generates a concatenated release vector B 913 for release B metadata 911, and a concatenated release vector C 923 for release C metadata 921. In an example embodiment, the concurrent, parallel generation of the three release vectors may involve invoking three instances of the multi-modal ANN 800. Through an iterative process that may involve sharing of weights between the three instances, and application of a common loss function 904, the multi-modal ANN 800 may be "tuned," and the release vectors A 903, B 913, and C 923 may be adjusted, such that any two or three the release vectors cluster if they are associated with the same artist ID, or any two or three the release vectors separate (anti-cluster) if they are associated with a different artist IDs.

The training process illustrated in FIG. 9B may be repeated for each possible triplet of release records in a training database. Note that through repeated application of the training procedure to all of the possible triplets, the same release record will be subject to training and adjustment on more than one training iteration, since each release record will be a tripled up, each time with a different pair of other release records. Thus, as the training process progresses, the release vector associated with a given release record may become more refined and accurate. That is, as the training process is applied to more and more triplets, the results may become more accurate and reliable. As with the case for n=2, clusters in the multi-dimensional feature vector space may become better defined for like artist ID, and more distinctly separated for unlike artist IDs. The meanings of "better defined" and "distinctly separated" is the same for n=3 as it is for n=2.

For both n=2 and n=3, once training is complete, a database or other persistent record of the formed clusters may be established. This database or record may be added to or associated with a release database, for example, and consulted at runtime, as described below. Additionally, the respective release feature vector associated with each given release record may be stored as a new or auxiliary data field or component of the given release record. In some arrangements, the respective release feature vector may be store separately from its associated release record, but with a link or other logical connection established associating both with each other.

The examples for n=2 and n=3 can be extended for n>3, as noted. As may be inferred by comparing the examples of n=2 and n=3, the complexity of the training operation may increase as n increases. However, example embodiments are not limited with respect to the size or value of n.

When training is complete, or at least sufficiently complete to have defined feature vector clusters for all (or possibly most) artist IDs in the training corpus, the trained multi-modal ANN may be applied to submissions to disambiguate their respective artist names (e.g., sub-definitive names) with respect to artist names associated with the established clusters. More specifically, the trained multi-modal ANN 800 may be applied to a submission record to generate a submission feature vector in the same way that a release feature vector is generated. That is, as described above in connection with FIGS. 3 and 4, submission records include much of the same type data—media content, metadata, etc.—that release records include. Thus, the multi-modal ANN may operate on a submission record in the same way it does on a release record.

Once a submission feature vector is generated, its location in the multi-dimensional feature vector space may be evaluated with respect to the clusters established during training. More particularly, the distance between the submission feature vector and each established cluster may be analytically computed. The distance between the submission vector and any given cluster may be computed in a variety of ways. For example, the center of a cluster may be defined as a centroid of its member vectors. Further, the member vectors could be weighted according to some attribute of the associated release record, such as release date (e.g., by the artist to the public). In an example, greater weight could be given to more recent releases. However, other weighting schemes could be used as well. Following the distance determinations, if the minimum distance among those computed is smaller than a predefined threshold distance, the submission feature vector may be deemed a member of the closest cluster to the submission feature vector (i.e., the cluster at the minimum of the computed distances). In this case, the submission associated with submission feature vector may be assigned the same artist ID as the release records associated with the cluster. With this determination, the artist name associated with the submission may be considered disambiguated, and a new release record corresponding to the submission record may be created and added to the release database, for example. The artist ID of the newly created release record may be set to that of the other release records of the cluster.

If the closest cluster to the submission feature vector is at a greater distance than the predefined threshold distance, then the submission feature vector may be deemed as not belonging to any existing (established) cluster. In this case, the associated submission may thus be determined to be that of an artist not previously known among those in the release database. With this determination, the artist name associated with the submission may again be considered disambiguated, and a new release record corresponding to the submission record may again be created and added to the release database, for example. However, the artist ID of the newly created release record may be set to a new value—i.e., new to the release database. Additionally, when a new artist ID is created, an alert or other message or signal may be conveyed to a human curator to double-check that the result is not an erroneous failure to match an existing artist ID. Whether or not such an alert is generated could further be subject to how much the predetermined threshold distance is exceeded. For a distance slightly beyond the threshold, the alert could be generated, while a distance far beyond the threshold might be considered unlikely to be an error, and therefore not be a cause for an alert.

Figure 10:
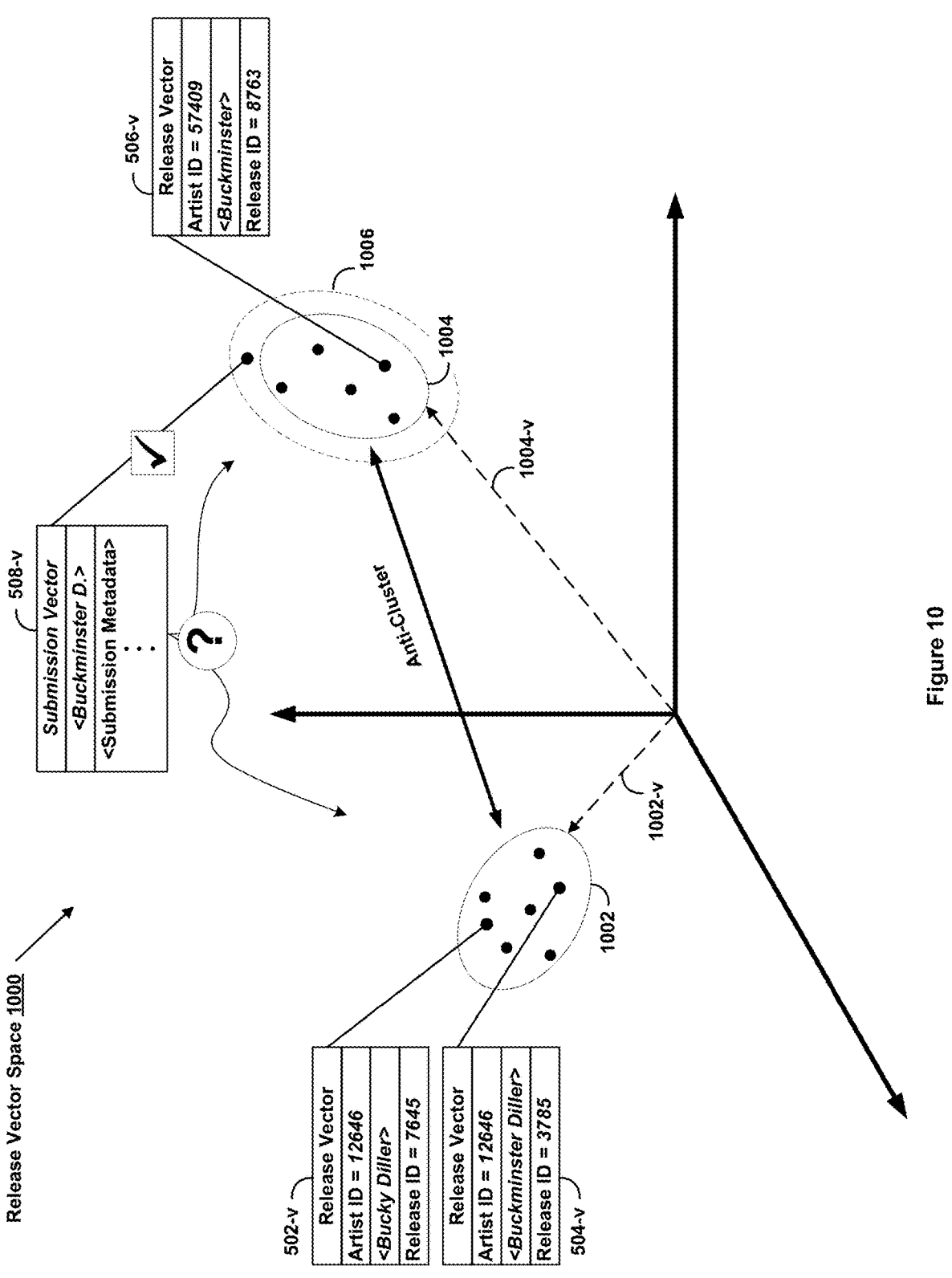
FIG. 10 is an example conceptual illustration of clustering of release vectors in release-vector space, in accordance with example embodiments.

FIG. 10 is an example conceptual illustration of clustering of release vectors in release vector space 1000, in accordance with example embodiments. For purposes of illustration, the release vector space 1000 is depicted as three unlabeled orthogonal axes. It should be understood that there could be more than three dimensions. By way of example, three release vectors 502-v, 504-v, and 506-v are shown, corresponding to the release records 502, 504, and

506, respectively, of FIG. 5. A submission vector 508-v, corresponding to the submission record 508 of FIG. 5 is shown as well.

The correspondence between the feature vectors in FIG. 10 and the records in FIG. 5 are signified by some of the common data. Namely, both the vectors and the records include the artist IDs, artist names, and release IDs. However, the actual content and structure of the feature vectors will typically be mathematically-expressed (or other quantitatively-expressed) representations—e.g., "features"—that characterize the data in the records. The angle brackets ("< >") enclosing some of the text in the vectors in FIG. 10 are a visual cue signifying the representational form of illustrating these feature vectors in a graphical figure.

FIG. 10 also shows, again by way of example, two release vector clusters 1002 and 1004 at positions 1002-v and 1004-v, respectively, in the release vector space 1000. Each respective cluster is depicted as an oval enclosing several black dots, each dot representing a release vector member of the respective cluster. The release vectors 502-v and 504-v are evidently members of the cluster 1002, as indicated by respective lines connecting to respective dots in the cluster 1002. Similarly, the release vector 506-v is shown to be a member of the cluster 1004 by a line connecting it to one of the dots cluster 1004. A double arrow (labeled "anti-cluster") between cluster 1002 and 1004 signifies the distance between the two clusters, as well as the anti-clustering process that evidently established and placed the two clusters.

The disambiguation operation may be represented as a determination of which of clusters 1002 or 1004 the submission vector 508-v is assigned to at runtime. As previously discussed by way of example in connection with FIG. 5, the artist name associated with the submission record 508 appears to be ambiguous with respect to the artist names in release records 504 and 508. A question mark ("?") overlaid on two branching arrows from the submission record 508-v represents this ambiguity in the context of the release vector space 1000. However, now the ambiguity can be resolved by evaluating the position of the submission record 508-v with respect to the two clusters that quantify the two choices. Evidently, and by way of example in this illustration, the submission vector 508-v is determined to be within a predetermined threshold distance, represented by threshold border 1006, to the cluster 1004. Accordingly, the submission record 508-v is to be considered a member of the cluster 1004. This determination comports with the same, largely intuitive, conclusion by inspection of the release records and submission record of FIG. 5. However, the determination by feature vector may be quantified and carried out analytically using computation techniques in accordance with the example operations described above. Thus, advantageously, the process of disambiguation may be automated, and thereby made fast, efficient and accurate on a scale commensurate with large-volume online music repositories and distribution services.

As described above in connection with FIG. 3, a MARR may include a release ID, a unique artist ID, and release data. The release data may include release media content, release artwork, and release metadata. In a more general specification of a MARR, the various components of the release data may be considered "release-data categories" and the release metadata may be considered "metadata categories" and/or "metadata subcategories." For example, the sub-definitive artist name may be considered one metadata subcategory, and the release title, release track name(s), release lyrics, and release genre, among others, may be considered metadata subcategories.

A similar, corresponding general specification of a submission record may be used as well. Specifically, the various components of the submission data may be considered "submission-data categories" and the submission metadata may also be considered "metadata categories" and/or "metadata subcategories." For example, the submission sub-definitive artist name may be considered one metadata subcategory, and the submission title, submission track name(s), submission lyrics, and submission genre, among others, may be considered submission metadata subcategories.

The exact specification of which data components are "categories" or "subcategories" is not limiting with respect to example embodiments herein, and is introduced herein for purposes of discussion. Other organizational nomenclatures applied to release records and submission records may be used as well.

While the operations above are described as using input data from release records, other, ancillary data more generally associated with specific artist IDs, but not necessarily associated directly or exclusively with a particular release record, could be used as inputs as well. For example, if an artist ID is associated with a group of artists, such as a rock and roll group or a group of classical artists (e.g., a string quartette), general information about the group, such date(s) when the group formed and/or disbanded, could be stored in the release database, and could serve as input in the disambiguation operations described above. Other types of general information could be stored and used in disambiguation as well.

IV. Example Method

FIG. 11 illustrates a flow chart of an example method 1100 that may be carried out by music-release disambiguation system, such as disambiguation system 100 shown in FIG. 1. The example method 1100 may be implemented as computer-readable instructions store in one or another form of memory (such as volatile or non-volatiles memory) of a computing device or system of the content-presentation device. An example of a computing system is shown in FIG. 2. When executed by one or more processors of the computing device or system, the instructions may cause the content-presentation device or system to carry out operations of the example method 1100. The computer-readable instructions may additionally be stored on a non-transitory computer readable medium, which may be used, for example, for loading the instructions into the memory of the computing system. In some examples, the non-transitory computer-readable medium could be the memory of the computing system.

Block 1102 may involve inputting to a multi-modal artificial neural network (ANN) implemented on the computing system a first plurality of musical-artist-release records (MARRs). Each respective MARR record may be associated with a given musical release of a given artist of a second plurality of musical artists. The first plurality could be a release database or a corpus of training data in the form of MARRs, or both. The second plurality may represent all of the known artists from among the first plurality of MARRs. Each respective MARR record may include: (i) a respective release ID of the given musical release and a unique artist identifier (ID) of the given artist, and (ii) respective release data assigned according to release-data categories. The release-data categories may include particular music media content associated with the given musical release, and a set of metadata categories including a sub-definitive musician name of the given artist and a subset of release subcategories specific to the given musical release.

Block 1104 may involve forming each possible n-tuple grouping of distinct MARRs from among the first plurality.

Block 1106 may involve, for each respective n-tuple grouping, concurrently applying the multi-modal ANN to each respective MARR of the respective n-tuple to generate an associated, respective release feature vector (RFV). For each respective MARR, the associated, respective RFV may also be associated with the unique artist ID of the respective MARR, and it may include a set of sub-feature vectors, each of which may respectively characterize release data of a different one of the release-data categories of the respective MARR. Additionally, the respective RFVs associated with the respective MARRs may be defined within a multi-dimensional RFV space.

Block 1108 may involve, for each respective n-tuple grouping, concurrently training the multi-modal ANN and adjusting the associated, respective RFVs to cluster in RFV space of all the respective RFVs associated with the same unique artist ID, and to also maximally separate in RFV space the respective RFVs associated with different unique artist IDs.

Finally, at block 1110 may involve storing each respective MARR together with its adjusted, associated, respective RFV in a musical release database.

In accordance with example embodiments, the example method 1100 may further involve receiving a runtime musical submission record that includes a submitted musician name and submitted music media content. The trained multi-modal ANN may then be applied to the runtime musical submission record to generate an associated runtime RFV, and a minimum of computed distances in RFV space between the associated runtime RFV and each respective cluster of RFVs associated the same unique artist ID may be determined. The minimum computed distance may thus be considered as separating the runtime RFV from a closest cluster. A new MARR associated with a new musical release may be created and stored in the musical release database. The new MARR may include the submitted music media content that is stored together with the associated runtime RFV. Further, the sub-definitive musician name of the new MARR may be set to the submitted musician name, and the unique artist ID of the new MARR may be set to either the unique artist ID associated with the closest cluster if the minimum distance is less that a threshold, or a new unique artist ID if the minimum distance is not less that the threshold.

In accordance with example embodiments, the multi-modal ANN may include a third plurality of component ANNs, each respectively associated with one of the respective release-data categories. With this arrangement, applying the multi-modal ANN to each respective MARR of the respective n-tuple to generate the associated, respective RFV may entail operations carried out for each respective RFV. The operations may include respectively generating each given sub-feature vector by the respective component ANN that is associated with the respective release-data category that is characterized by the given sub-feature vector, and concatenating the set of sub-feature vectors into the respective RFV.

In further accordance with example embodiments, the example method may also include operations carried out prior to concurrently applying the multi-modal ANN to each respective MARR of the respective n-tuple. Specifically, these prior operations may include inputting to each respective component ANN a respective corpus of modal training data, where each respective corpus of modal training data may include data of a respective release-data category and associated ground-truth data. The prior operations may further include individually pre-training each respective component ANN to generate a respective mode feature vector (MFV) as an intermediate pre-training step in a complete pre-training process. The complete pre-training process may entail modally pre-training each respective component ANN to predict the ground-truth data associated with the respective corpus of modal training data given the respective corpus of modal training data as input. Each respective MFV may include data characterizing features of the respective release-data category associated with the respective corpus of modal training data. The prior operations may also include using respective weights of each component ANN determined in pre-training as initial respective weights in concurrently applying the multi-modal ANN to each respective MARR of the respective n-tuple.

In further accordance with example embodiments, each component ANN may include an input layer, an output layer, and one or more intermediate layers. With this arrangement, respectively generating each given sub-feature vector by the respective component ANN may entail generating the given sub-feature vector by one of the one or more intermediate layers of the respective component ANN.

In accordance with example embodiments, n may be equal to 2, in which case each respective n-tuple grouping is a pair of distinct MARRs. In an alternative arrangement, n may be equal to 3, in which case each respective n-tuple grouping is a triplet of distinct MARRs.

In accordance with example embodiments, the sub-definitive musician name may be one of: a unique musician name, or a non-unique musician name that differs from the unique musician name by an ambiguity factor. The ambiguity factor may be one or more of: a mis-spelling, an additional one or more initials, an absence of one or more initials, an alias, or a language translation of the unique musician name. It should be noted that even a unique musician name may be considered sub-definitive since it is possible for two different artists to have the identical musician name. This illustrates how and why a musician name—unique or otherwise—may not necessarily by itself distinguish between two different MARRs.

In accordance with example embodiments, concurrently training the multi-modal ANN and adjusting the associated, respective RFVs to cluster in RFV space of all the respective RFVs associated with the same unique artist ID, and to maximally separate in RFV space the respective RFVs associated with different unique artist IDs may entail iteratively adjusting weights of the multi-modal ANN to adjust the respective RFVs of each respective n-tuple in a manner that reduces a first distance in RFV space between the respective RFVs associated with the same unique artist ID, and that increases a second distance in RFV space between the respective RFVs associated with different unique artist IDs.

In accordance with example embodiments, the particular music media content one or more of digital audio content or digital video content. Further, the subset of release subcategories may include release title, music track titles, summary artist biography, release lyrics, release genre, and associated release graphical art.

V. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:

providing, to an artificial neural network (ANN) implemented on a computing system, musical-artist-release records (MARRs) each being associated with a given musical release of a given artist and comprising (i) a release ID of the given musical release and a unique artist identifier (ID) of the given artist and (ii) release data assigned according to release-data categories that comprise particular music media content associated with the given musical release, and a set of metadata categories including a sub-definitive musician name of the given artist and a subset of release subcategories specific to the given musical release;

forming distinct groupings of the MARRs;

for each grouping of the distinct groupings of the MARRs, concurrently applying the ANN to each MARR of the grouping to generate a release feature vector (RFV) for each MARR of the grouping wherein the RFV is associated with the unique artist ID of the MARR and comprises a set of sub-feature vectors that characterize the release data of the release-data categories of the MARR, and wherein the RFV is defined within an RFV space;

for each grouping of the distinct groupings of the MARRs, concurrently training the ANN and adjusting the RFV to cluster in the RFV space with other RFVs associated with the same unique artist ID, and to maximally separate in the RFV space RFVs associated with different unique artist IDs; and storing each of the MARRs together with its respective RFV in a musical release database.

2. The method of claim 1, further comprising:

receiving a submitted musician name and a submitted music media content;

applying the ANN to the submitted musician name and the submitted music media content record to generate a runtime RFV;

determining a minimum of computed distances in RFV space between the runtime RFV and each cluster of RFVs associated with the same unique artist ID, wherein the minimum computed distance separates the runtime RFV from a closest cluster; and creating and storing in the musical release database a new MARR associated with a new musical release, the new MARR including the submitted music media content, and being stored together with the runtime RFV, wherein the sub-definitive musician name of the new MARR is set to the submitted musician name, and the unique artist ID of the new MARR is set to either: the unique artist ID associated with the closest cluster if the minimum distance is less than a threshold, or a new unique artist ID if the minimum distance is not less that the threshold.

3. The method of claim 1, wherein the RFV is an associated RFV, wherein the ANN comprises component ANNs each associated with one of the release-data categories, and wherein applying the ANN to generate the associated RFV comprises:

for each associated RFV, generating each given sub-feature vector by the component ANN that is associated with the release-data category that is characterized by the given sub-feature vector;

and concatenating the set of sub-feature vectors into the associated RFV.

4. The method of claim 3, wherein the method further comprises, prior to concurrently applying the ANN to each MARR of each of the groupings:

providing to each of the component ANNs a corpus of modal training data, each of the corpuses comprising data of a release-data category and associated ground-truth data;

individually pre-training each of the component ANNs to generate a mode feature vector (MFV) as an intermediate pre-training step in a complete pre-training process of modally pre-training each of the component ANNs to predict the ground-truth data associated with the corpus of modal training data given the corpus of modal training data as input, wherein each MFV comprises data characterizing features of the release-data category associated with the corpus of modal training data; and using weights of each component ANN determined in pre-training as initial weights in concurrently applying the ANN to each MARR of the grouping.

5. The method of claim 3, wherein each of the component ANNs comprises an input layer, an output layer, and one or more intermediate layers, and wherein generating each given sub-feature vector by the component ANN comprises generating the given sub-feature vector by one of the one or more intermediate layers of the component ANN.

6. The method of claim 1, wherein each grouping of the distinct groupings of the MARRs includes two or three distinct MARRs.

7. The method of claim 1, wherein the sub-definitive musician name is one of: a unique musician name or a non-unique musician name that differs from the unique musician name by an ambiguity factor, and wherein the ambiguity factor is at least one of: a mis-spelling, an additional one or more initials, an absence of one or more initials, an alias, or a language translation of the unique musician name.

8. The method of claim 1, wherein concurrently training the ANN and adjusting the RFV comprises:

iteratively adjusting weights of the ANN to adjust the RFVs of each in a manner that reduces a first distance in RFV space between the RFVs associated with the same unique artist ID, and that increases a second distance in RFV space between the RFVs associated with different unique artist IDs.

9. The method of claim 1, wherein the particular music media content is at least one of digital audio content or digital video content, and wherein the subset of release subcategories comprises: release title, music track titles, summary artist biography, release lyrics, release genre, and associated release graphical art.

10. A system comprising:

one or more processors; and memory storing instructions that, when executed by the one or more processors, cause the system to carry out operations comprising:

providing, to an artificial neural network (ANN) implemented on a computing system, musical-artist-release records (MARRs) each being associated with a given musical release of a given artist and comprising (i) a release ID of the given musical release and a unique artist identifier (ID) of the given artist and (ii) release data assigned according to release-data categories that comprise particular music media content associated with the given musical release, and a set of metadata categories including a sub-definitive musician name of the given artist and a subset of release subcategories specific to the given musical release;

forming distinct groupings of the MARRs;

for each grouping of the distinct groupings of the MARRs, concurrently applying the ANN to each MARR of the grouping to generate a release feature vector (RFV) for each MARR of the grouping wherein the RFV is associated with the unique artist ID of the MARR and comprises a set of sub-feature vectors that characterize the release data of the release-data categories of the MARR, and wherein the RFV is defined within an RFV space;

for each grouping of the distinct groupings of the MARRs, concurrently training the ANN and adjusting the RFV to cluster in the RFV space with other RFVs associated with the same unique artist ID, and to maximally separate in the RFV space RFVs associated with different unique artist IDs; and storing each of the MARRs together with its respective RFV in a musical release database.

11. The system of claim 10, wherein the operations further include:

receiving a submitted musician name and a submitted music media content;

applying the ANN to the submitted musician name and the submitted music media content record to generate a runtime RFV;

determining a minimum of computed distances in RFV space between the runtime RFV and each cluster of RFVs associated with the same unique artist ID, wherein the minimum computed distance separates the runtime RFV from a closest cluster; and creating and storing in the musical release database a new MARR associated with a new musical release, the new MARR including the submitted music media content, and being stored together with the runtime RFV, wherein the sub-definitive musician name of the new MARR is set to the submitted musician name, and the unique artist ID of the new MARR is set to either: the unique artist ID associated with the closest cluster if the minimum distance is less than a threshold, or a new unique artist ID if the minimum distance is not less that the threshold.

12. The system of claim 10, wherein the RFV is an associated RFV, wherein the ANN comprises component ANNs each associated with one of the release-data categories, and wherein applying the ANN to generate the associated RFV comprises:

for each associated RFV, generating each given sub-feature vector by the component ANN that is associated with the release-data category that is characterized by the given sub-feature vector;

and concatenating the set of sub-feature vectors into the associated RFV.

13. The system of claim 12, wherein the operations further comprise prior to concurrently applying the ANN to each MARR of each of the groupings:

providing to each of the component ANNs a corpus of modal training data, each of the corpuses comprising data of a release-data category and associated ground-truth data;

individually pre-training each of the component ANNs to generate a mode feature vector (MFV) as an intermediate pre-training step in a complete pre-training process of modally pre-training each of the component ANNs to predict the ground-truth data associated with the corpus of modal training data given the corpus of modal training data as input, wherein each MFV comprises data characterizing features of the release-data category associated with the corpus of modal training data; and using weights of each component ANN determined in pre-training as initial weights in concurrently applying the ANN to each MARR of the grouping.

14. The system of claim 12, wherein each of the component ANNs comprises an input layer, an output layer, and one or more intermediate layers, and wherein generating each given sub-feature vector by the component ANN comprises generating the given sub-feature vector by one of the one or more intermediate layers of the component ANN.

15. The system of claim 10, wherein each grouping of the distinct groupings of the MARRs includes two or three distinct MARRs.

16. The system of claim 10, wherein the sub-definitive musician name is one of: a unique musician name or a non-unique musician name that differs from the unique musician name by an ambiguity factor, and wherein the ambiguity factor is at least one of: a mis-spelling, an additional one or more initials, an absence of one or more initials, an alias, or a language translation of the unique musician name.

17. The system of claim 10, wherein concurrently training the ANN and adjusting the RFV comprises:

iteratively adjusting weights of the ANN to adjust the RFVs of each in a manner that reduces a first distance in RFV space between the RFVs associated with the same unique artist ID, and that increases a second distance in RFV space between the RFVs associated with different unique artist IDs.

18. The system of claim 10, wherein the particular music media content is at least one of digital audio content or digital video content, and wherein the subset of release subcategories comprises: release title, music track titles, summary artist biography, release lyrics, release genre, and associated release graphical art.

19. A non-transitory computer-readable medium having instructions stored thereon that, when executed by one or more processors of a system for disambiguating musical artist names, cause the system to carry out operations including:

providing, to an artificial neural network (ANN) implemented on a computing system, musical-artist-release records (MARRs) each being associated with a given musical release of a given artist and comprising (i) a release ID of the given musical release and a unique artist identifier (ID) of the given artist and (ii) release data assigned according to release-data categories that comprise particular music media content associated with the given musical release, and a set of metadata categories including a sub-definitive musician name of the given artist and a subset of release subcategories specific to the given musical release;

forming distinct groupings of the MARRs;

for each grouping of the distinct groupings of the MARRs, concurrently applying the ANN to each MARR of the grouping to generate a release feature vector (RFV) for each MARR of the grouping wherein the RFV is associated with the unique artist ID of the MARR and comprises a set of sub-feature vectors that characterize the release data of the release-data categories of the MARR, and wherein the RFV is defined within an RFV space;

for each grouping of the distinct groupings of the MARRs, concurrently training the ANN and adjusting the RFV to cluster in the RFV space with other RFVs associated with the same unique artist ID, and to maximally separate in the RFV space RFVs associated with different unique artist IDs; and storing each of the MARRs together with its respective RFV in a musical release database.

20. The non-transitory computer-readable medium of claim 19, wherein the operations further include:

receiving a submitted musician name and a submitted music media content;

applying the ANN to the submitted musician name and the submitted music media content record to generate a runtime RFV;

determining a minimum of computed distances in RFV space between the runtime RFV and each cluster of RFVs associated with the same unique artist ID, wherein the minimum computed distance separates the runtime RFV from a closest cluster; and creating and storing in the musical release database a new MARR associated with a new musical release, the new MARR including the submitted music media content, and being stored together with the runtime RFV, wherein the sub-definitive musician name of the new MARR is set to the submitted musician name, and the unique artist ID of the new MARR is set to either: the unique artist ID associated with the closest cluster if the minimum distance is less than a threshold, or a new unique artist ID if the minimum distance is not less that the threshold.

\* \* \* \* \*